Figure 19:
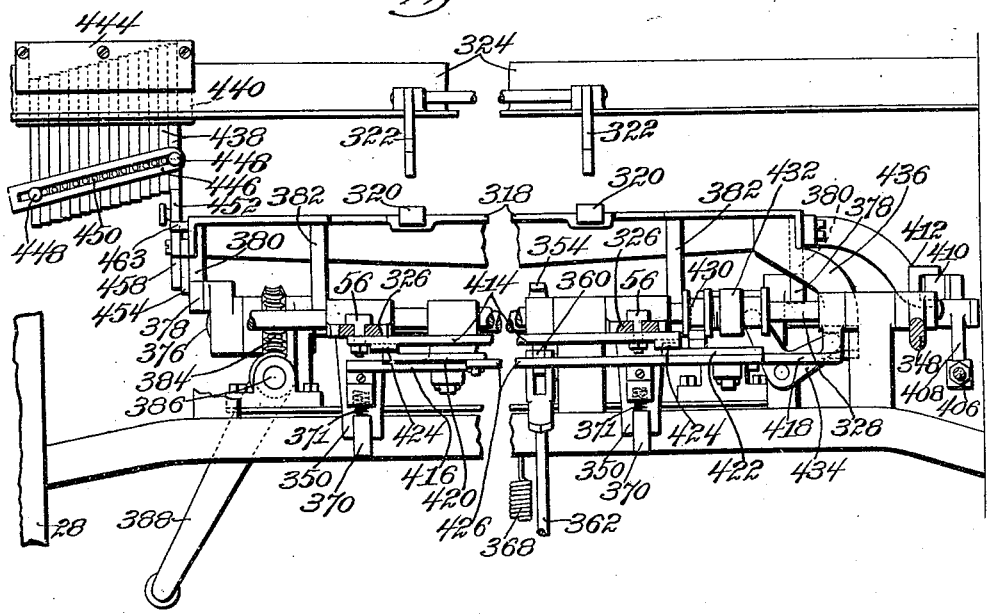

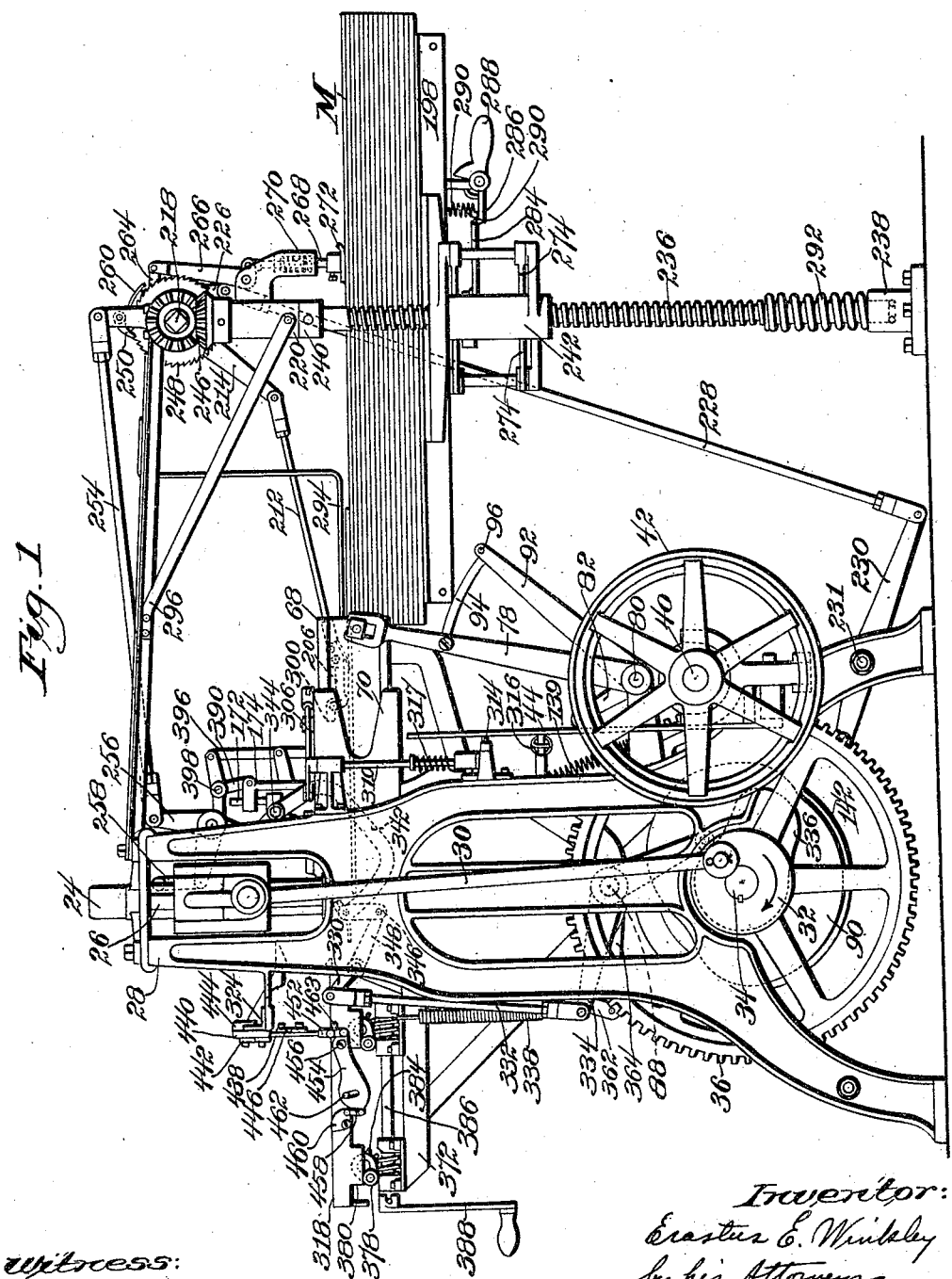

E. E. WINKLEY.
STOCK CUTTING MACHINE.
APPLICATION FILED OCT. 16, 1916.
1,412,225.
Patented Apr. 11, 1922.
13 SHEETS—SHEET 2.
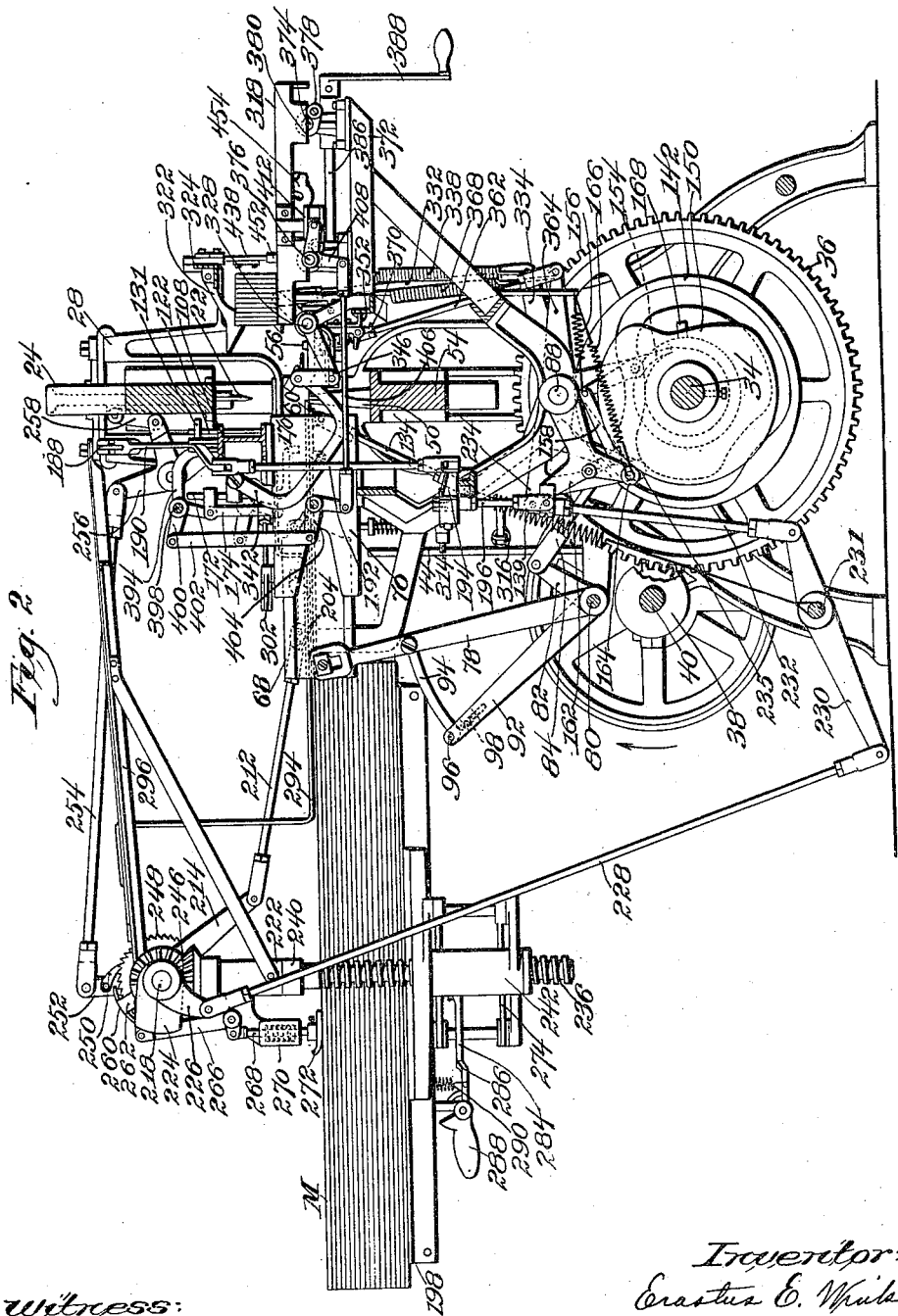

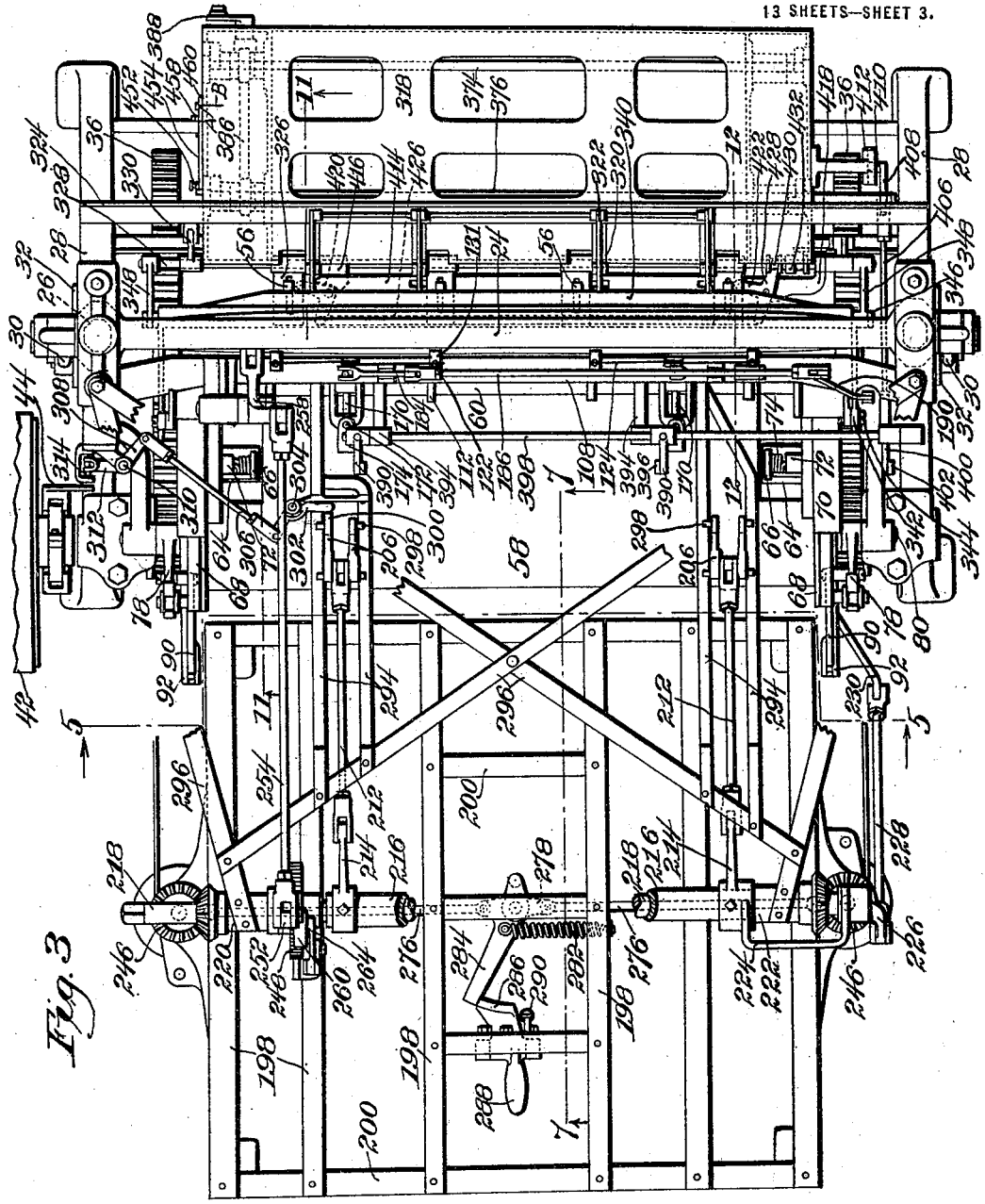

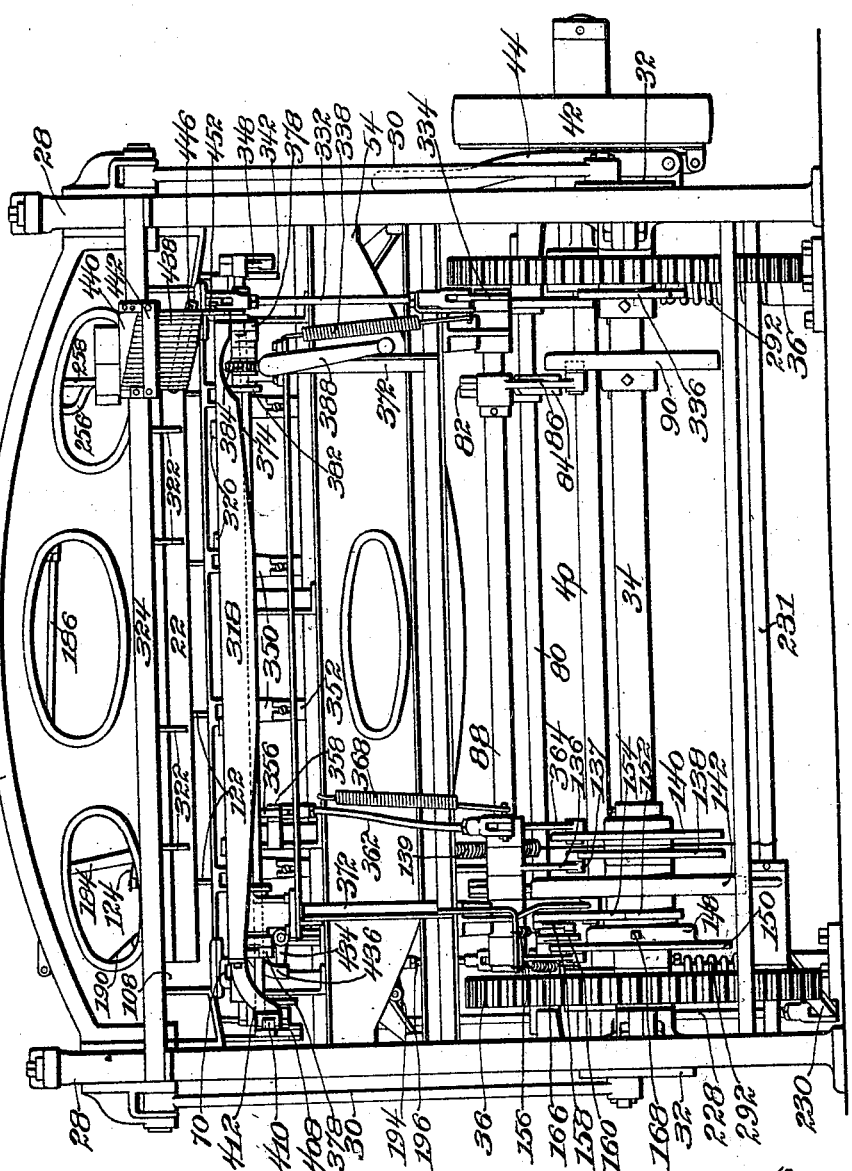

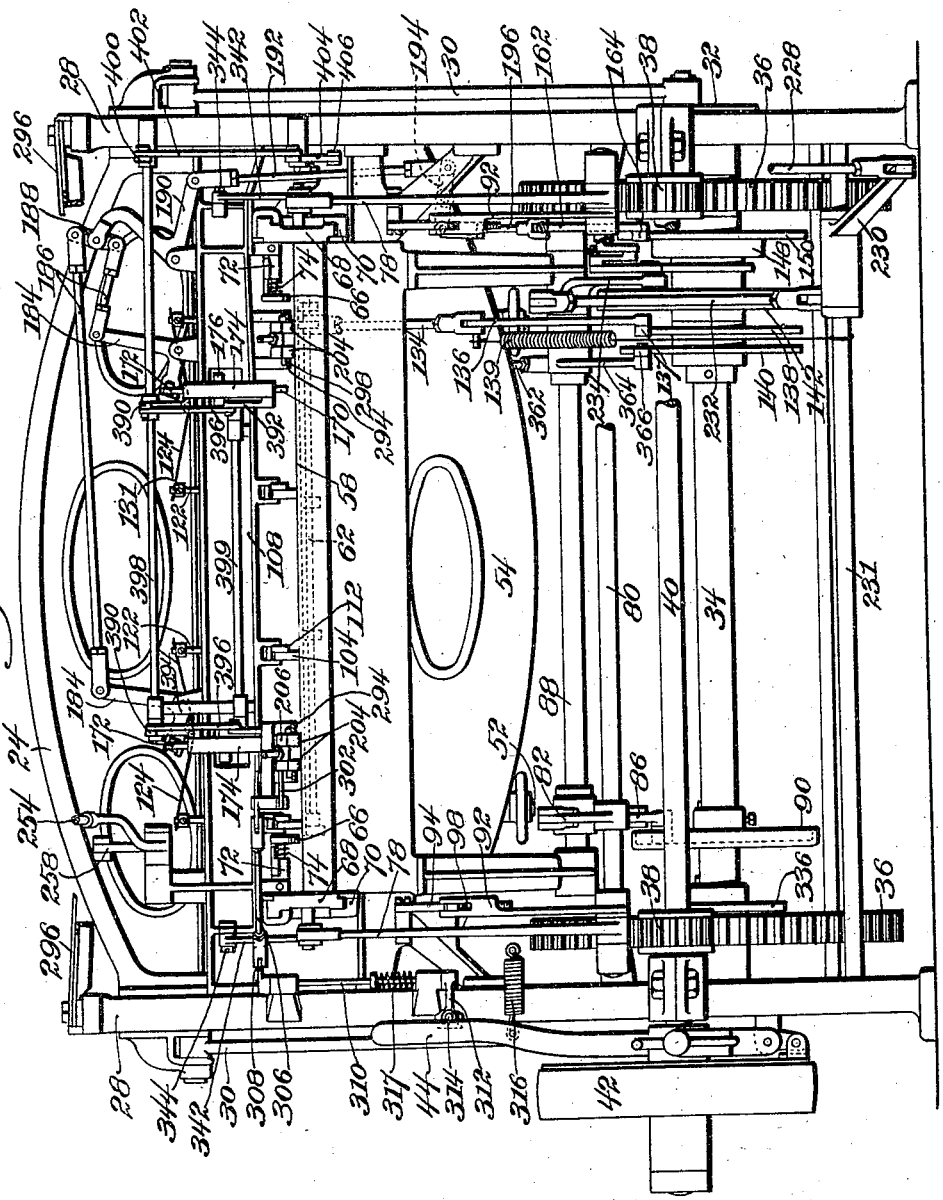

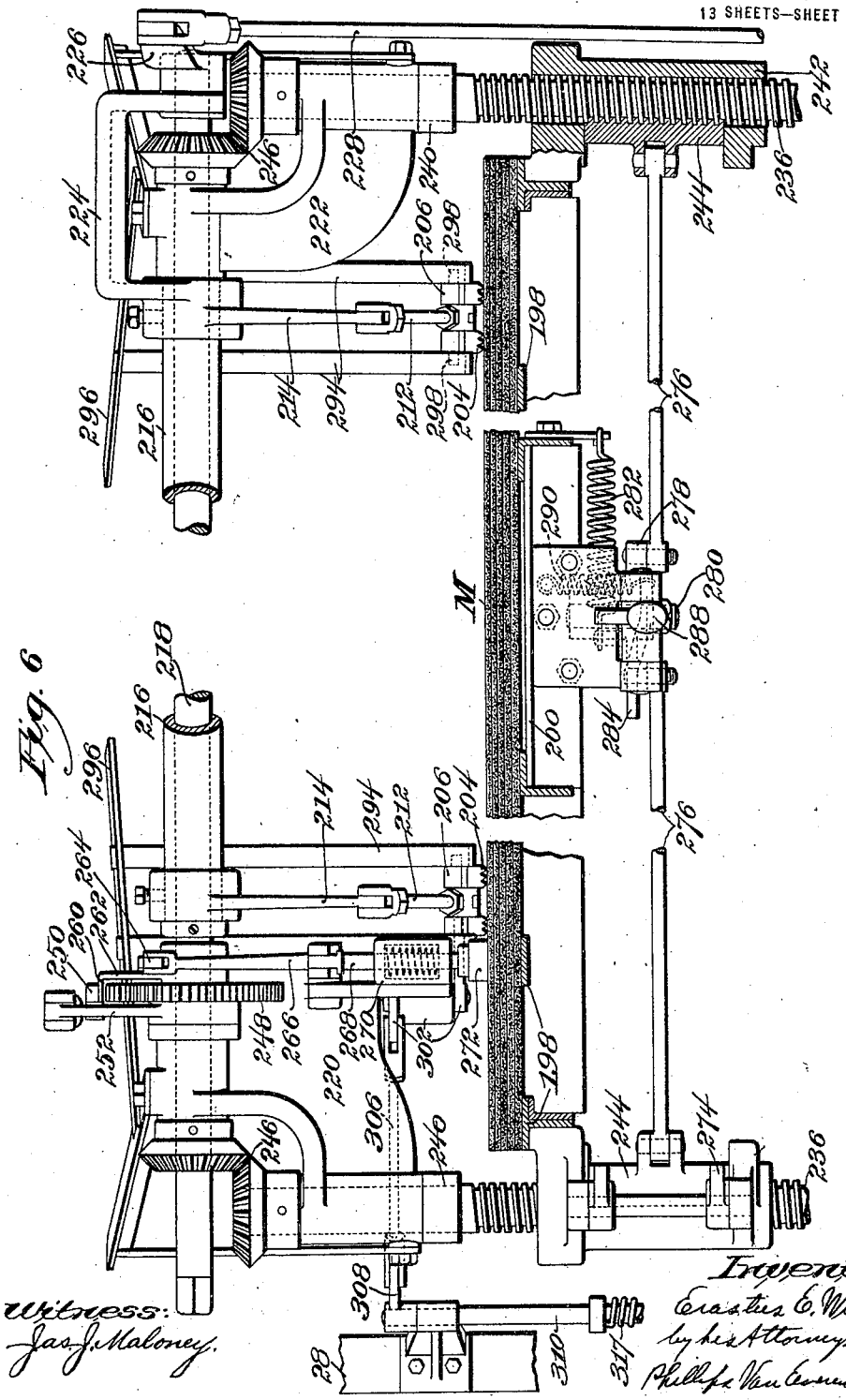

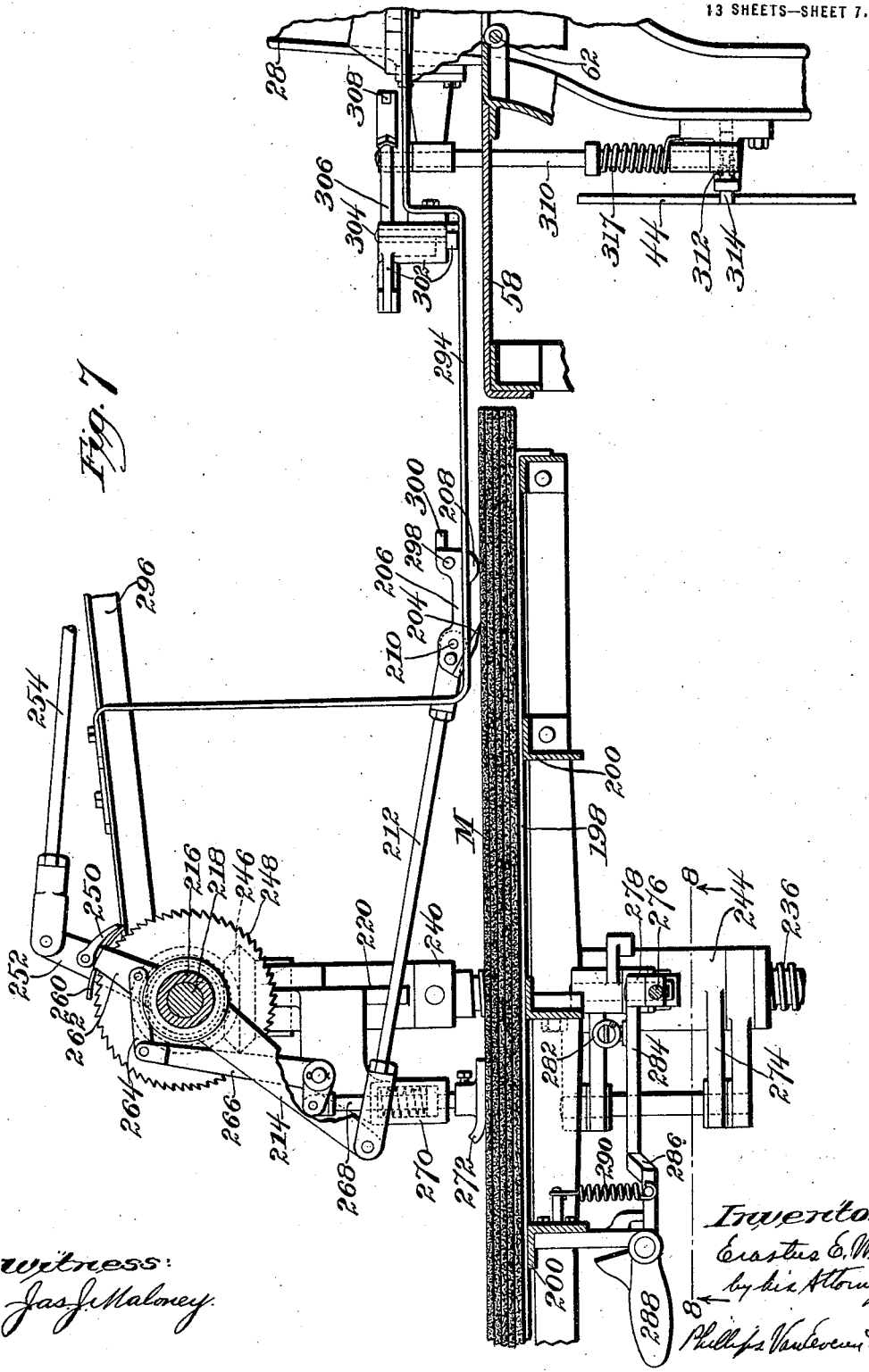

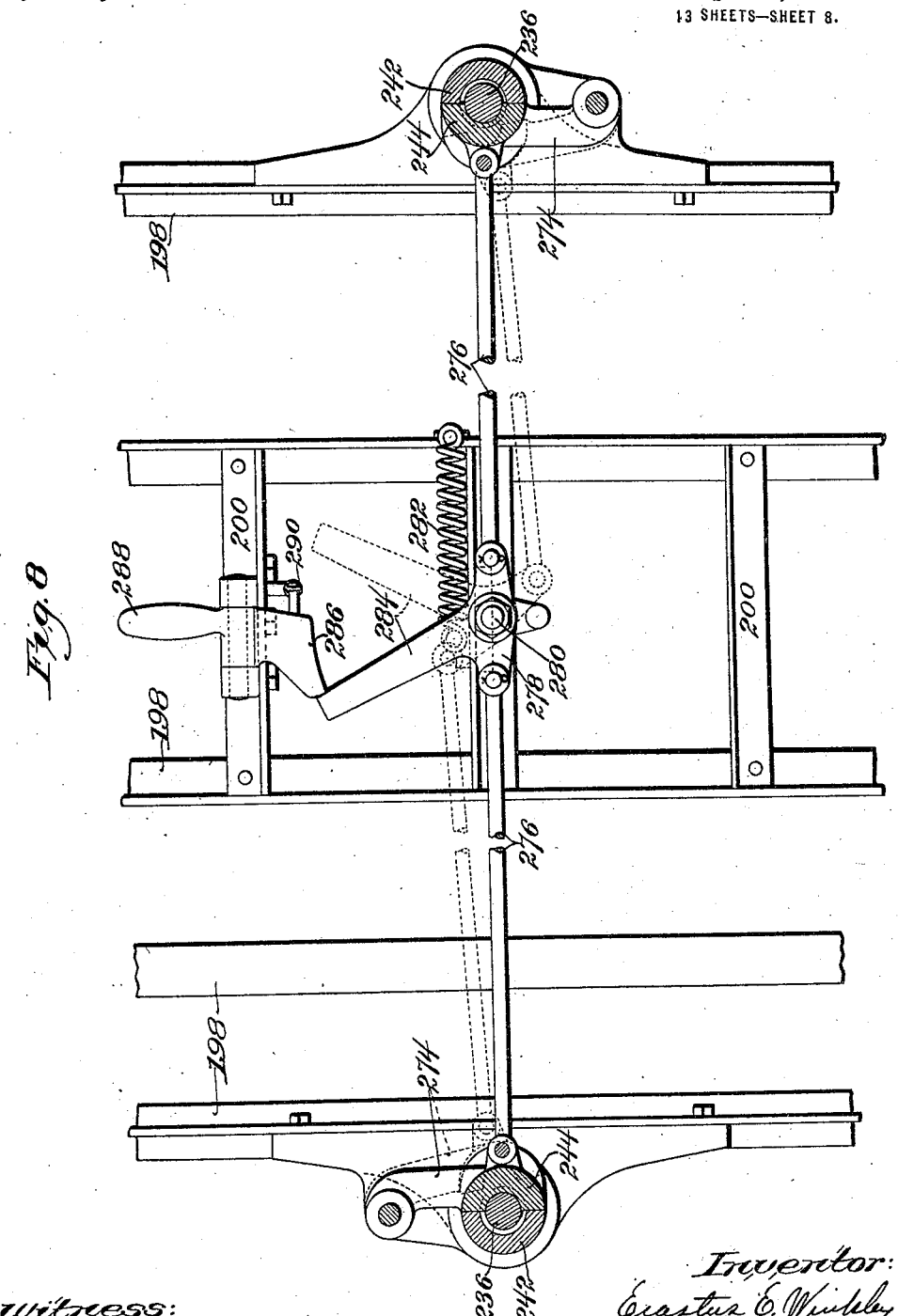

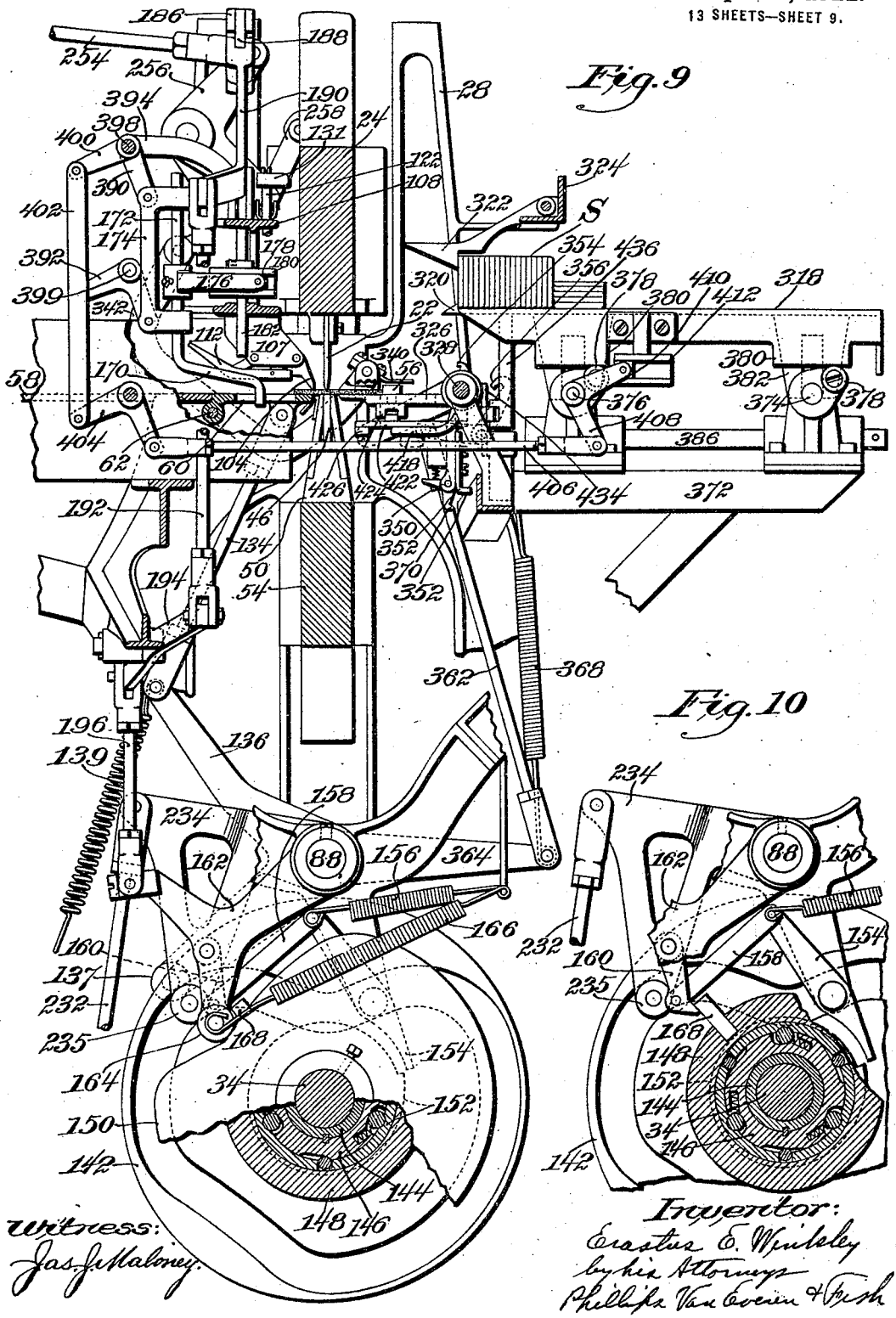

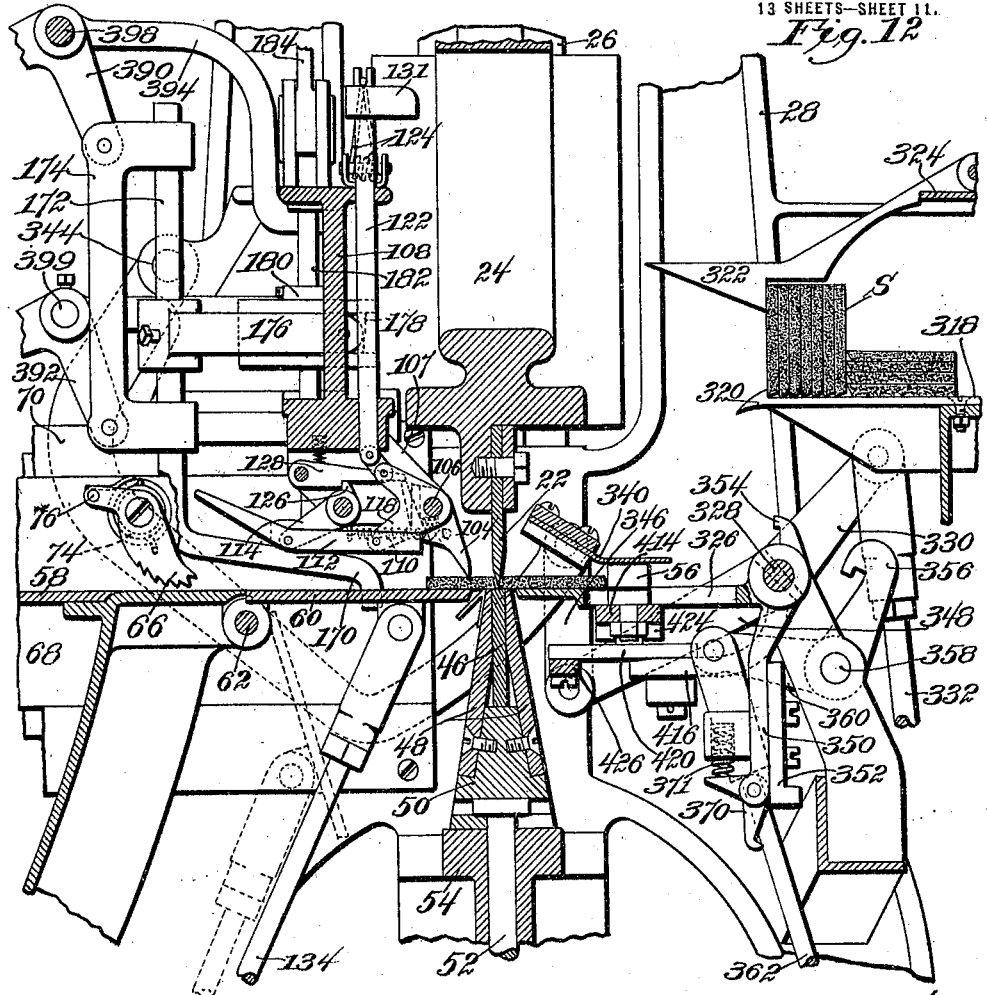
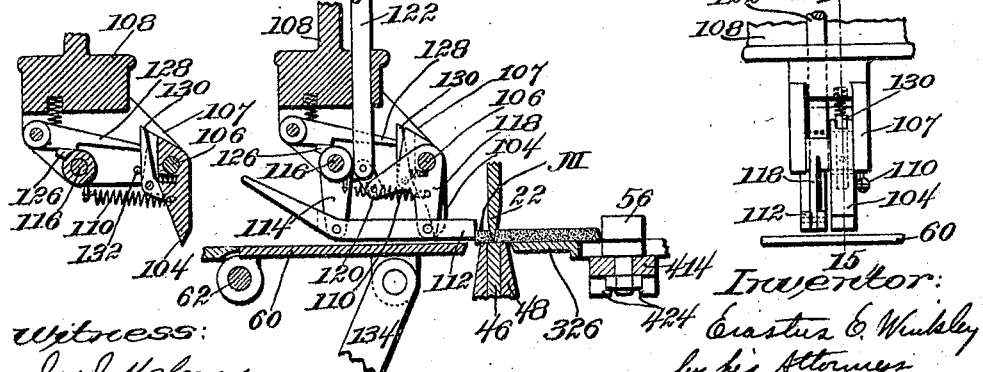

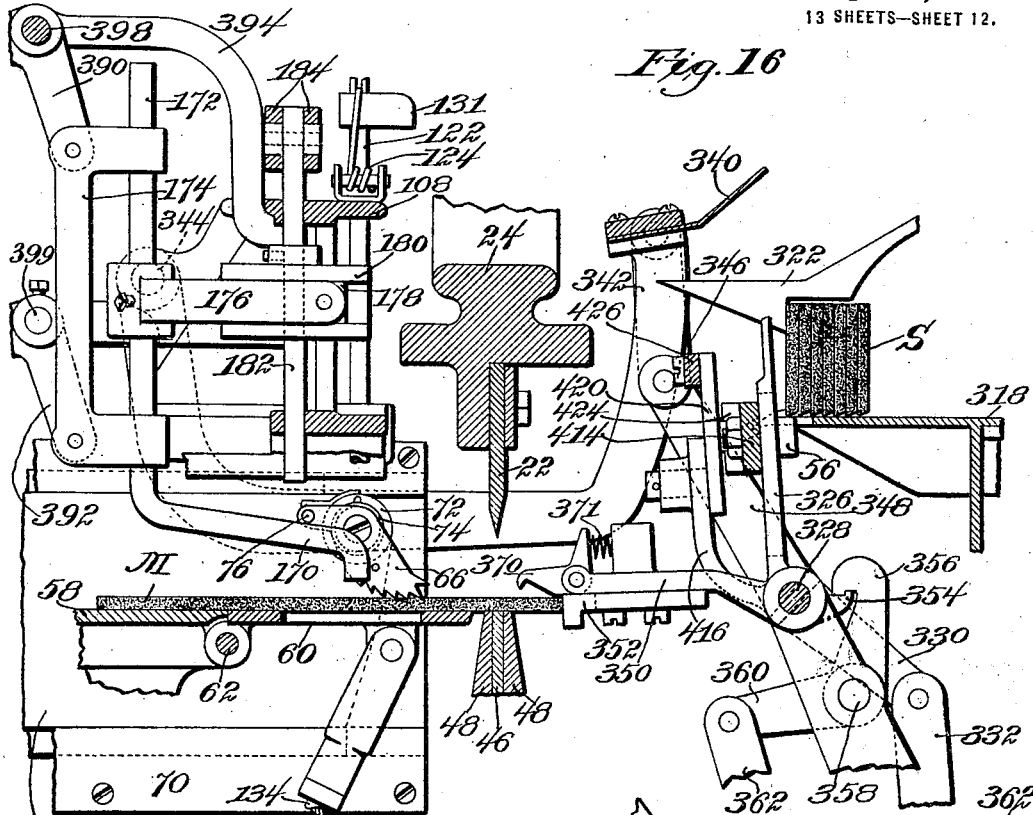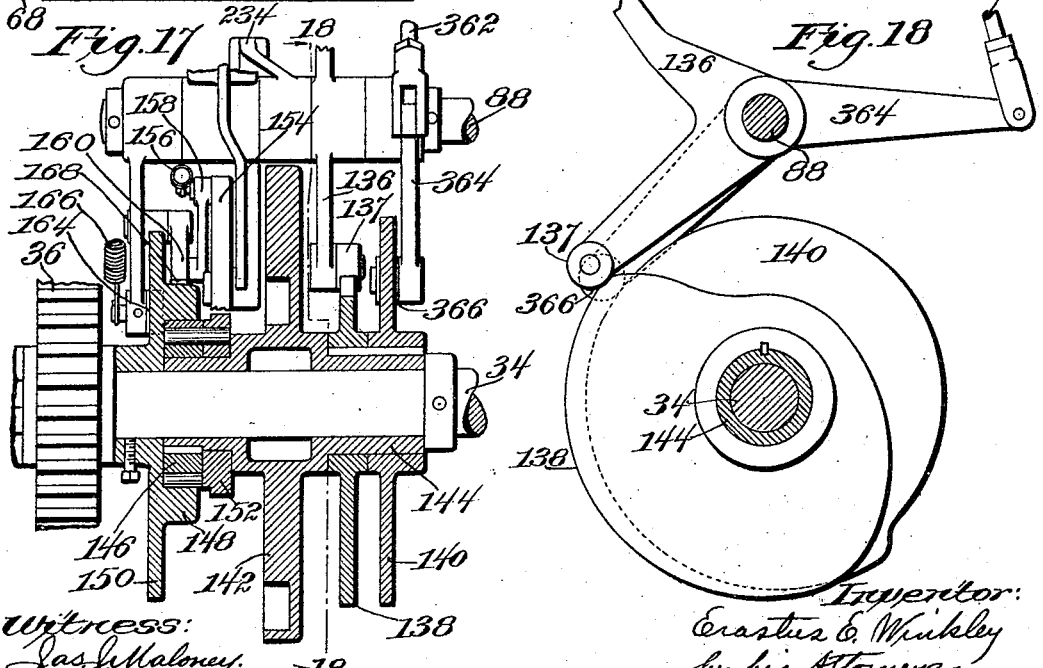

E. E. WINKLEY.
STOCK CUTTING MACHINE.
APPLICATION FILED OCT. 16, 1916.

1,412,225.

Patented Apr. 11, 1922.

13 SHEETS—SHEET 13.

UNITED STATES PATENT OFFICE.

ERASTUS E. WINKLEY, OF LYNN, MASSACHUSETTS, ASSIGNOR, BY MESNE ASSIGN-
MENTS, TO UNITED SHOE MACHINERY CORPORATION, OF PATERSON, NEW JER-
SEY, A CORPORATION OF NEW JERSEY.

STOCK-CUTTING MACHINE.

1,412,225.

Specification of Letters Patent. Patented Apr. 11, 1922.

Application filed October 16, 1916. Serial No. 125,977.

*To all whom it may concern:*

Be it known that I, ERASTUS E. WINKLEY, a citizen of the United States, residing at Lynn, in the county of Essex and State of Massachusetts, have invented certain new and useful Improvements in Stock-Cutting Machines; and I do hereby declare the following to be a full, clear, and exact description of the invention, such as will enable others skilled in the art to which it appertains to make and use the same.

This invention relates to a machine for cutting sheets of material into uniform pieces or strips by the repeated operation of cutting-instrumentalities.

One object of the invention is to provide for the retention and delivery of the cut pieces in a form convenient for transferring them from the cutting-machine to other machines in which the cut pieces are subsequently utilized. To this end the present machine is provided with means by which the cut pieces are retained and delivered in stacked relation, with the pieces lying in substantially vertical position and the stack extending horizontally. Since the sheets of material are most conveniently fed to the cutting-instrumentalities in substantially horizontal position, this feature of the invention involves the use of means by which each piece, after cutting, is turned from a horizontal to a vertical position, prior to its introduction to the stack.

Another object of the invention is to provide against the inclusion, with the perfect pieces, of the piece first cut from the end of the sheet and having, at one edge, the irregularities which may be present in the original edge of the sheet. To this end the machine is provided with means for automatically separating the piece first cut from the pieces subsequently cut. In order that the use of material may be economized, the machine is further provided with gaging-means operating automatically to gage the feed of the sheet so that the piece first cut is a narrow piece or trimming, of only sufficient width to insure the removal of the irregularities from the edge of the sheet.

Another object of the invention is to provide the machine with feed-mechanism for advancing the sheet prior to each operation of the cutting-means, and to so organize and construct the feed-mechanism that it shall feed the sheet completely, so as to utilize it fully, with the exception of such a comparatively narrow waste-piece as may necessarily be left at the rear end of the sheet. For this purpose the machine comprises feeding-means normally operating to advance the sheet by engagement with its lateral surfaces, together with auxiliary feeding-means adapted, prior to the last operation of the cutting-means, to feed the sheet by engagement with its rear edge, whereby the sheet may be fed more completely than is possible by the use of the normally operative feeding-means. In this connection the machine also embodies automatic means for throwing the auxiliary feeding-means into operation at the proper time.

Another object of the invention is to facilitate the adjustment of the machine to cut pieces of different sizes from the sheet-material. Such adjustment involves changes in the positions of a plurality of different instrumentalities, these instrumentalities including, in the most complete embodiment of the invention, a delivery-table, the end-stops or gages by which the width of the cut pieces is determined, and the feelers which control the automatic mechanism for supplying the successive sheets of material; and to the foregoing end these several instrumentalities, or a plurality of them, are so interconnected that they may be adjusted simultaneously and proportionately from a single point, or by a single instrumentality.

Another object of the invention is to provide the machine with means by which it may be conveniently and accurately adjusted to produce pieces of a plurality of predetermined or graded sizes. To this end the machine is provided with gaging-means, hereinafter described, to assist the operator in setting or adjusting the machine for the several sizes of the pieces to be produced.

Other objects of the invention, and the features of construction by which they are attained, will be set forth hereinafter in connection with the following description of the illustrated embodiment of the invention.

Figure 20:
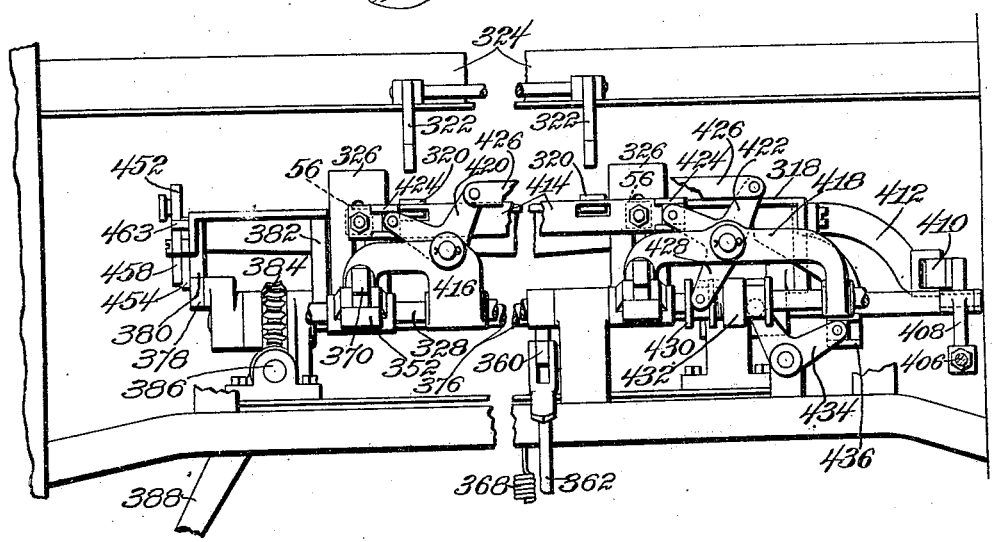

In the accompanying drawings Fig. 1 is a side-elevation of a machine embodying the present invention; Fig. 2 is an elevation of the opposite side of the machine from that shown in Fig. 1, with one of the side-frames and adjacent parts of the machine removed to show the mechanism more clearly; Fig. 3 is a plan-view of the machine, with parts of the framework broken away; Fig. 4 is a front-elevation of the machine; Fig. 5 is a rear-elevation, with the sheet-supplying and feeding mechanism removed in section approximately on the line 5—5 in Fig. 3; Fig. 6 is a front-elevation, partly in vertical section, on a larger scale than the preceding figures, of parts of the mechanism for supplying and feeding the sheets of material; Fig. 7 is a vertical section approximately on the line 7—7 in Fig. 3, but on a larger scale than the latter figure; Fig. 8 is a bottom-view of a portion of the sheet-supply mechanism, in section on the line 8—8 in Fig. 7; Fig. 9 is similar to a portion of Fig. 2, but with the parts shown on a larger scale and in a different position; Fig. 10 is a fragmentary view, with parts broken away, of the cam - mechanism and clutch - mechanism shown in Fig. 9; Fig. 11 is a vertical section approximately on the line 11—11 in Fig. 3, but on a larger scale than the latter figure; Fig. 12 is a partial vertical section, approximately on the line 12—12 in Fig. 3 but on a larger scale; Fig. 13 is a fragmentary view showing, partly in vertical section, the auxiliary sheet-feeding means and adjacent parts; Fig. 14 is a front-elevation of the auxiliary feeding-means; Fig. 15 is a vertical section on the line 15—15 in Fig. 14; Fig. 16 is a fragmentary view similar to a portion of Fig. 12, but showing the parts in different positions; Fig. 17 is a front-elevation, partly in vertical section, of the automatic clutch-mechanism and the cam-mechanism associated therewith; Fig. 18 is a detail-view, in side-elevation, of certain of the cam-mechanisms, in section on the line 18—18 in Fig. 17; and Figs. 19 and 20 are fragmentary views, in rear-elevation, showing, in different operative positions, the strip-transferring mechanism and particularly the means for adjusting the receiving-table and the end-stops.

The invention is illustrated as embodied in a machine in which sheets of leather-board or similar material are cut automatically into straight-edged strips of uniform width, and in which these strips are then stacked in parallel relation upon a receiving-table. The strips in question are intended for use in the manufacture of blocks from which shoe-heels are formed, and since such strips must be made in a variety of widths, the machine is provided with means for adjusting not only the length of feed, which determines the width of each strip, but also the height of the table on which the strips are stacked, and the position of the feelers which automatically determine the time when it is necessary to supply a fresh sheet of material to the cutting-instrumentalities. The machine is provided, further, with means for supplying sheets of material automatically one by one, as required. Since the operator, in adjusting the machine and removing the cut strips, stands at the part of the machine at which the strips are delivered and stacked, this part is herein referred to as the "front" of the machine, while the part at which the sheet-supplying mechanism is located is described as the "rear" of the machine.

The sheet-material is cut by means of an acute-edged knife 22, which is mounted on a horizontal cutter-beam 24 (Figs. 3, 5 and 12). The beam is guided, at its ends, on rods 26 which are supported vertically in the end-frames 28 of the machine, and the beam is reciprocated by rods 30 which connect its ends with crank-pins fixed in discs 32 on the ends of the drive-shaft 34 of the machine. This drive-shaft is provided with gears 36 which mesh with pinions 38 on a power-shaft 40, also journaled in the frame of the machine, and the power-shaft is provided with a pulley 42 by which it may be connected with any suitable source of power. The pulley is connected with the power-shaft by a clutch of any ordinary or suitable form, this clutch being controlled by a hand-lever 44, so that the machine may be conveniently started and stopped.

As shown particularly in Fig. 12, the knife 22 works against a surface which is provided by the edge of a strip or cutting-block 46 of suitable material, such as fibre-board, whereby injury to the edge of the knife is prevented. This strip is supported, between thin clamp-plates 48, upon a bar 50 which, in turn, rests upon a fixed horizontal beam or frame-member 54. The bar 50 is removably attached to the beam by means of bolts 52, so that the parts may be disassembled for the purpose of adjusting the height of the cutting-block between the clamp-plates, by introducing shims beneath the strip 46, or in any other convenient manner.

By the construction just described, a cutting-bed is produced which is very narrow, being only of the width necessary to support the material directly beneath the knife. This feature is of value in the discharge of the waste-pieces cut from the ends of the sheet, since it permits these pieces to be discharged downwardly on either side of the bed, either by gravity or by means provided for the purpose.

In case of strips for use in the manufacture of shoe-heels, it is sometimes desirable that these strips be so formed that each strip has one square edge and one beveled edge, since the strips may be afterwards so assembled that the square edges together form the square breast-surfaces of the heel-blocks, while the beveled edges together form an inclined surface approximating to the inclination or pitch of the back of the heel.

This formation of the edges of the strips is secured, in the present machine, by the form of the knife which is employed. This knife, as illustrated, is beveled, on both faces, but the angle of its rear surface is greater than that of its forward surface. The exact angles necessary in the two bevels depend upon the consistency of the material upon which the machine is to operate, but it has been found that in every case the result of producing one square edge and one beveled edge in the material at each cut is secured by providing the knife with two faces beveled at different angles, whereas, if one face of the knife be flat and the other face beveled, the knife, when acting upon thick and tough material such as leather-board, will produce one positively-beveled edge and one negatively-beveled or undercut edge in the material.

The sheet M of material is fed horizontally between the knife and the cutting-bed, and the width of the strip which is severed is determined by the engagement of the end-edge of the sheeet with four end-stops 56. During the feeding movement the sheet is supported (Figs. 3 and 12) partly upon a stationary horizontal table 58, and partly upon an inner table 60, this inner table forming normally a horizontal extension of the table 58 but being pivoted to the latter on a transverse rod 62 so that it may be swung downwardly, as will be presently described.

The sheet is fed past the knife and against the end-stops by means adapted to engage and clamp the lateral marginal portions of the sheet. These means comprise, at each side of the table 58, a lower member 64 and an upper member 66, to engage the upper and lower surfaces respectively (Figs. 3 and 11). The lower members 64 are in the form of lugs projecting inwardly from two slides 68 which move horizontally in guideways 70 located at the sides of the table 58. The upper feed-members 66 are in the form of toothed dogs, which are pivoted on posts 72 projecting inwardly from the slides 68. A spring 74, coiled around each post 72, tends to rock the dog in a direction to swing its toothed end into engagement with the sheet-material, while this movement of the dog is limited, when no material is in place beneath the dog, by a stop pin 76 on the dog, which engages a corresponding lug on the post 72.

The slides 68 are reciprocated constantly during the operation of the machine, by means of lever-arms 78 which are articulated, at their upper ends with the slides, and are loosely journaled, at their lower ends, on a rock-shaft 80 having bearings on the frame of the machine. An arm 82 fixed on the rock-shaft is connected, by a rod 84, with a cam-lever 86 which turns freely upon a rod 88 mounted on the frame of the machine. This cam-lever carries a roller which engages a path in a cam 90, and the cam is mounted on and rotated by the drive-shaft 34.

The rocking movements of the shaft 80, produced by the cam-mechanism just described, are imparted to two arms 92 which project upwardly from the rock-shaft, alongside the respective arms 78 (Figs. 5 and 11). A curved link 94 is pivoted to each arm 78 and passes through the bifurcated upper end of the corresponding arm 92 and beneath a pin 96 which is fixed transversely in the latter. A spring 98, seated in a perforation in the arm 92, bears against the lower surface of the link, so as to press it yieldingly against the pin. At its forward end each link is provided with a notch 100 and an upwardly projecting extremity.

At the rearward movement of the arms 92, the pins 96 slide along the links 94 until they engage the hooked extremities of the links, whereupon further movement of the arms 92 is communicated to the slides 68, which are thus drawn to their invariable rearmost positions. Upon the return or forward movement of the arms 92, this movement is transmitted to the links 94, and thence to the slides 68, owing to the fact that the springs 98 tend to retain the links in the position in which the notches 100 are engaged by the pins 96. If there were no material to be fed, the slides 68 would thus participate fully in the movements of the arms 92. However, when a sheet of material is present, the forward movement of the slides 68 continues only until the end of the sheet engages the end-stops 56. Thereupon the resistance to further movement of the feed-mechanism results in the disengagement of the pins 96 from the notches 100, and the further forward movement of the arms 92 is idle. Upon the succeeding return-movement of the arms 92, however, the feed-slides 68 are again drawn to their invariable rearmost position as before; and thus the mechanism is adapted to feed the sheet forward through a space determined wholly by the position of the end-stops. To prevent the feed-slides from moving rearwardly, owing to their momentum, beyond the point to which they are carried by the arms 92, spring-pressed buffers 102 (Fig. 11) are mounted on the guideways 70 in position to engage and arrest the posts 72. This yielding feed mechanism is not claimed specifically herein as it is disclosed and claimed in a copending application Serial No. 25,453 filed May 3, 1915 by the present applicant.

While the feed-mechanism just described feeds the sheet throughout the greater part of its extent, it is incapable of feeding the last portion of the sheet, in which enough material may still remain to produce another useful strip. Accordingly, supplementary feeding-means are provided for feeding this extremity, these means being shown particularly in Figs. 9, 12, 13, 14 and 15.

Four pawls 104, with sharpened lower extremities, are mounted, on pivots 106, between brackets 107 which extend downwardly from a horizontal cross-beam 108, this beam forming a member of the stationary frame of the machine. The extremities of the pawls rest against the upper surface of the sheet of material, and the pawls thus act as retaining-devices to prevent retrograde movement of the sheet during the return-movement of the feed-dogs 66. These pawls also perform the further function of acting as automatic means for throwing into operation the supplementary feeding-means above referred to. The pawls are held in engagement with the work both by gravity and by the action of springs 110 attached to them.

The final feed-movement is imparted to the sheet by the engagement, with its rear end or edge, of four pushers 112, each of which is associated with one of the pawls 104. Each pusher is in the form of a bar, which is supported, in horizontal position, by pivotal connections with two parallel arms 114 and 118. The arm 114 swings loosely upon a stud 116 in the rear of the pivot-stud 106, while the arm 118 swings loosely upon the stud 106 and constitutes one arm of a bell-crank lever, of which the other arm 120 is connected, by a short link, as shown in Fig. 13, with a vertical slide rod 122. The upper ends of the rods 122 are engaged and pressed downwardly by springs 124, which are mounted on studs supported on the frame-member 108, as shown in Figs. 5 and 12.

The hub at the upper end of the arm 114 is provided with a lug 126 adapted to co-operate with a shoulder on a detent 128, which is pivoted between the brackets which support the studs 106 and 116. This detent is pushed downwardly by a spring, but it co-operates, at its right-hand end, with a trip 130 which is pivotally mounted on the pawl 104, as shown particularly in Fig. 15, the trip being controlled by a spring which tends to swing its upper end to the left.

The normal position of the parts just described is shown in Fig. 12. In this position the arms 114 and 118 are swung to the left, and are retained in this position by engagement of the lug 126 with the detent 128, the pusher 112 being thereby held in retracted position, and also raised clear of the path of movement of the material, while the slide-rod 122 is in its raised position.

When, in the normal operation of feeding the material, the material has been advanced to such an extent that its rear end has passed beyond the pawl 104, as shown in Fig. 13, the pawl is swung downwardly and rearwardly by the spring 110, and this causes the trip 130 to push upwardly on the right-hand end of the detent 128, thereby raising the detent and releasing the lug 126. Thereupon the spring 124 forces the slide-rod 122 downwardly, causing the arms 114 and 118 to swing to the right and advance the pusher 112 into engagement with the edge of the sheet, so as to push it firmly into engagement with the end-stops 56, notwithstanding the fact that it has been removed beyond the range of movement of the feed-dogs 66. In this manner the sheet is economically utilized to its fullest possible extent, and only a narrow waste-piece is left at the rear edge or end, if any.

Owing to the fact that each pusher is advanced independently by spring-action, each pusher accommodates itself to the portion of the edge of the sheet which is in position to be engaged by it, and thus all of the pushers may act simultaneously on the sheet notwithstanding any irregularities in the shape and the angle of the edge.

To provide for the return of the supplementary feed-mechanism to its normal position, an arm 131 is fixed to the upper end of each of the slide-rods 122. These arms overhang a flange on the rear surface of the cutter-beam 24, as shown in Fig. 12, and on the subsequent rise of the beam, the slide-rods are accordingly raised, thus swinging the arms 114 and 118 rearwardly and bringing the lugs 126 into co-operative relation with the detents 128. Upon the introduction, beneath the pawls 104, of the next sheet of material, they swing to the right, and the trips 130 yield and move idly past the ends of the detents to their normal position beneath the detents, the movement of the trips to the left being limited by a stop-pin 132, as shown in Fig. 15.

After the last possible strip has been severed from the sheet, it is necessary to discharge, separately from the severed strips, the waste-piece remaining at the end of the sheet. This waste-piece may be of more or less width, but in any case, owing to the narrow surface of the cutting-bed, it will fall clear of the cutting-bed, even when of the minimum width shown in Fig. 13, since it is dislodged by the action of the knife. It is necessary, however, in order to permit the waste-pieces to fall and be discharged, that the pivoted table 60 be swung downwardly, and for this purpose, the table is connected, by a rod 134, (Figs. 5 and 9) with a bell-crank lever 136, which is mounted on the rod 88. This lever carries a roller 137 which engages a cam 138 on the cam-shaft 34.

The downward movement of the table is produced by gravity, assisted by a spring 139 which is attached to the lever 136, and the cam 138 moves the table positively to its normal raised position. Since the table 60 is to be operated as just described only when the end of the sheet is reached, the cam is not actuated constantly, but is thrown into operation automatically when the end of the sheet is reached. The mechanism for this purpose is shown particularly in Figs. 9, 10 and 17. The cam 138, together with a cam 140, which will be described later, is fixed on a sleeve 144 with which a third cam 142 is also integral. The sleeve is mounted to turn loosely upon the cam-shaft 34, and is normally stationary. The sleeve is connected with the shaft, however, by a clutch of the Horton type, which is so well known that it need not be particularly described. It will be understood that this clutch has friction-rollers adapted to rotatably connect its two elements, of which the inner one 146 is mounted on the end of the sleeve 144, while the outer element 148 is fixed to the shaft by set-screws, as shown in Fig. 17. The friction-rollers are normally held out of operation by means comprising a controller-ring 152, this ring being provided, as shown in Fig. 10, with a shoulder which cooperates with a detent 154. The detent is pivoted on the frame of the machine, and is held in operative position by a spring 156 connected to its upper end. When the detent is momentarily disengaged from the controller-ring, the clutch operates to impart a single rotation to the sleeve 144 and the cams thereon, and is then arrested again by the engagement of the detent with the shoulder.

The detent is tripped by power derived from the constantly rotating clutch-member 148. For this purpose the detent is connected, by a link 158, with a trip 160, which is pivotally mounted on a lever 162. This lever swings upon the rod 88 and is provided with a roller 164 which engages the periphery of a cam 150 formed integral with the clutch-member 148. A spring 166 tends to hold the roller in engagement with the cam-surface, and at each rotation of the cam, the roller, when it encounters a low point in the cam-surface, as shown in Fig. 9, permits the lever 162, if otherwise free, to swing toward the shaft 34, thus bringing the trip 160 within the path of movement of a pin 168 which projects from the clutch-member 148. The pin swings the trip to the left, and thus, through the link 158, rocks the detent 154 momentarily into inoperative position. This tripping action does not occur, however, at every rotation of the cam 150, owing to the fact that the lever 162 is normally held in raised position by means extraneous to the cam, as will be now described.

In order to render the operation of the machine as fully as possible automatic, the machine is provided with automatic controlling-means comprising feelers which move into position to engage the sheet of material after each feeding-movement thereof. In case the sheet has been so far consumed as to have passed beyond the point of operation of the feelers, the feelers detect that fact, and thereupon set into motion, not only the mechanism for ejecting the waste-piece, as just described, but also mechanism for supplying a fresh sheet of material.

The feelers 170, just refered to, are two in number (Figs. 5, 9, and 16), and they are formed by bending forwardly and downwardly the lower portions of two rods 172, of which the main portions are vertical and are arranged to slide in the upper and lower ends of yoke-shaped frames 174. These frames are supported in adjustable stationary position by means hereinafter described. Fixed to each feeler-rod 172 is a forwardly projecting horizontal arm 176, which is pivoted to a block 178 seated in a horizontal slot formed in the side of a head 180. Each head 180 is fixed on a rod 182 which slides vertically in bearings on the stationary frame-member 108. The rods 182 are pivoted, at their upper ends, to the horizontal arms of bell-crank levers 184 (Fig. 5), and the vertical arms of these levers are connected, by rods 186, with the upper and lower ends, respectively, of a compensating-lever 188. The compensating-lever is pivoted, at the middle, to one arm of a bell-crank lever 190, which is mounted on the frame of the machine, and the other arm of the lever 190 is pivoted to a vertical rod 192, which depends at one side of the machine. The lower end of the rod 192 is connected, by a short lever 194, with a rod 196, (Figs. 5 and 9), while the lower end of the rod 196 is pivoted to the cam-lever 162.

At each rotation of the cam 150, when the low point of its surface encounters the roller 164 as in Fig. 9, if there be material beneath the ends of both of the feelers 170, the feelers and the rods 172 are retained in raised position, and, through the arms 176 and the heads 180, the rods 182 are retained in raised position. The positive connection between these last-named rods and the cam-lever 162, by way of the system of levers and rods above described, causes the cam-lever, accordingly, to be supported in raised position when the roller 164 is disengaged by the cam-surface, so that the detent 154 is not tripped, and the Horton clutch remains inoperative. If, on the other hand, the sheet of material is so far exhausted that it has been drawn entirely beyond the feelers 170, the feelers descend into openings in the pivoted table 60, as shown in Fig. 9, permitting the cam-lever 162 to fall, and cause the clutch to be thrown into operation. This action occurs even if, owing to irregularities in the edge of the sheet of material, one feeler only is permitted to descend while the other arm is supported upon the sheet. In such a case the compensating lever 188 permits the bell-crank lever 190 to swing, regardless of the fact that one of the feelers is still supported by the material.

The machine is provided, as before indicated, with means for supporting a stack of sheets of material, and for supplying these sheets, one by one, as required, to the feed-table 58 and into the range of operation of the feed-dogs 66. These means are located at the rear of the machine as shown particularly in Figs. 1 and 2.

The stack of material is supported upon a supply-table in the form of a horizontal frame comprising parallel longitudinal members 198 and parallel cross-members 200 (Figs. 3, 6, 7 and 8). The material rests upon the longitudinal members 198, and is automatically supported in such a position that the uppermost sheet is just above the level of the feed-table 58, as shown in Fig. 7.

The sheets are removed from the top of the stack, and deposited upon the feed-table, by means of members 204 which may be designated as supply-dogs. These dogs have sharpened extremities which are directed forwardly and pressed against the upper surface of the sheet-material. The dogs are fixed, in pairs, to parallel slide-bars 206 which are provided, at their forward ends, with convex runners 208 adapted to slide upon the surface of the material. At their rear ends the slide-bars of each pair are connected, by a pivot 210, with a rod 212 which is pivoted to the lower end of an arm 214. The arms are fixed to a sleeve 216 which turns loosely upon a shaft 218. This shaft extends transversely above the supply-table, being supported by bearings in brackets 220 and 222 (Fig. 6) which are themselves supported by means hereinafter described.

The supply-dogs are actuated through rocking movements imparted to the sleeve 216. For this purpose a yoke 224 is fixed to one end of the sleeve, so as to span the bracket 222, and the yoke has a rearwardly extending arm 226 which is connected, by a rod 228, with a lever 230 (Fig. 2.) this lever being pivoted on a rod 231 which constitutes part of the machine frame. The forward end of the lever 230 is connected, by a rod 232, with a cam-lever 234 (Fig. 10), this lever being provided with a roller 235 which engages a path in the side of the cam 142 above referred to. In consequence of this arrangement the supply-dogs are actuated in a forward direction and then returned to their normal position once at each operation of the Horton clutch.

After a sheet has been supplied from the stack it is necessary to raise the stack in order to bring the next sheet to the level of the feed-table, and for this purpose means are provided for raising the supply-table automatically through a distance equal to the thickness of the sheets. The supply-table is supported by two vertical screw-threaded rods 236 at the sides of the table, these rods having stepped bearings 238 (Fig. 1) at their lower ends which rest upon the floor. At their upper ends the rods 236 have bearings in the brackets 220 and 222, and are provided with collars 240 upon which these brackets rest, the brackets being therefore supported by the rods 236. The supply-table is provided, at each side, with a sleeve 242 which embraces the corresponding rod 236, and each sleeve is cut away at the inside to admit a half-nut 244, which is threaded to mesh with the threads on the rod. The supply-table is thus supported, through the sleeves and the nuts, upon the rods 236, and by rotation of the rods the table may be raised when necessary.

The rods 236 are rotated automatically, at the proper time, by mechanism controlled by a foot which rests on the top of the stack. For the purpose of so rotating the rods, they are connected at their upper ends, through bevel-gears 246, with the shaft 218, so that they may be rotated in unison by this shaft. Fixed to the shaft is a ratchet-wheel 248 (Figs. 6 and 7) which is actuated by a pawl 250, pivotally mounted on an arm 252. This arm is loosely pivoted on the shaft 218, and is connected, by a rod 254, with a bell-crank lever 256 (Figs. 1 and 2) which is mounted on a bracket projecting from the frame-member 108. The bell-crank lever is connected, by a link 258, with the cutter-beam 24, so that at each reciprocation of the beam the arm 252 is swung about the shaft 218.

The operation of the pawl 250 is controlled by a shield 260, which engages the end of the pawl. This shield is mounted on an arm 262, which is loosely pivoted on the shaft 218, and the pawl may or may not be operative upon the ratchet-wheel according as the shield is moved out of or into a position in which it can hold the pawl free from the ratchet wheel throughout the entire range of movement of the pawl.

The position of the shield is controlled by a foot 272 which rests upon the uppermost sheet. This foot is mounted on a spring-pressed stem 268, which slides in a sleeve 270 projecting from the bracket 220. The upper end of the stem is connected, through a bell-crank lever 266, with a link 264 of which the forward end is pivoted to the arm 262.

Whenever the uppermost sheet is in the position shown in Fig. 7, the foot 272 is held in a position such that the shield 260 renders the pawl entirely inoperative, but upon the withdrawal of a sheet the foot falls, and thus permits the pawl a range of effective operation which is proportionate to the thickness of the sheet and the distance through which the foot has fallen, so that the stack is automatically raised to a distance equal to the thickness of the sheet which has been withdrawn.

To facilitate the application of a stack of material to the supply-table, means are provided by which the table may be released and permitted to fall to its lowermost position. For this purpose the half-nuts 244 are mounted, as shown in Fig. 8, on arms 274 which are pivoted alongside the sleeves 242. These arms are connected by rods 276, with two arms of a three-armed lever 278, which is mounted on a stud 280 at the middle of the table. A spring 282, attached to the lever 278, tends to rock it in a direction to pull the rods 276 inwardly, as shown in dotted lines in Fig. 8, but the parts are normally retained with the nuts in engagement with the rods 236. For this purpose the third arm 284 of the lever is arranged to cooperate with a latch 286 which is pivoted beneath the supply-table. The latch is provided with a handle 288, however, and when this handle is raised the lever 278 is released, and the nuts 244 disengage the rods 236, whereupon the table falls. The latch is retained normally in operative position by a spring 290, and buffer-springs 292 (Fig. 1) are coiled around the lower parts of the rods 236 to prevent jar when the supply-table falls.

After the material has been placed upon the supply-table, the table may be raised, to bring the uppermost sheet to the level of the feed-table, by turning the shaft 218, and for this purpose one end of the shaft is squared, as shown in Fig. 6 of the drawing, to receive a hand-crank.

The machine is provided with mechanism by which it is automatically stopped whenever the supply of sheet-material upon the supply-table has become exhausted. For this purpose one of the slide-bars 206 (Fig. 7) upon which the supply-dogs are mounted, is arranged to cooperate with a releasing-mechanism for the drive-clutch through which the power shaft 40 is actuated. This releasing-mechanism is engaged by the slide-bar whenever, owing to the absence of a sheet of material, the slide-bar is not supported in its normal elevated position as shown in Fig. 7.

Alongside the paths of movement of the slide-bars, horizontal guide-rods 294 are mounted, the rear ends of these rods being supported on braces 296 which connect the brackets 220 and 222 with the main frame of the machine. The slide-bars are provided, at their ends, with pins 298 which project over the guide-rods. These pins are normally held a short distance above the rods, but in the absence of a sheet of material the pins rest upon the rods and thus support the slide-bars and prevent injurious engagement of the supply-dogs with the feed-table 58. The release-mechanism for the clutch comprises a lever 302 which is mounted, as shown in Figs. 3 and 7, upon a vertical pivot 304 in a bracket fixed to the guide-rods 294 at one side of the machine. One arm of the lever 302 is so located that it is engaged by a lug 300 extending forwardly from one of the slide-bars 206 whenever the slide-bar is in the position in which the pin 298 rests upon the guide-rods.

During the normal operation of the machine, when the slide-bars are supported on a sheet of material, the lug 300 is held in a position above the arm of the lever 302, so as to clear the latter. In the absence of a sheet of material, however, the lug engages the lever, at the extremity of the forward movement of the slide-bar and rocks it. This movement is transmitted from the lever, through a rod 306, to an arm 308 fixed on the upper end of a rock-shaft 310, this shaft being mounted in bearings on the frame of the machine. An arm 312, fixed to the lower end of the rock-shaft, is connected with a latch 314 which is slidable into and out of position to engage the hand-lever 44 by which the drive-clutch is controlled, as above described. A spring 316, attached to the hand-lever, tends to swing it in a direction to release the clutch, and this movement is normally prevented by the latch 314. The latch is retracted, however, by the movement imparted by the slide-bar as just described. When the machine is first started into operation by the hand-lever, the latch is retracted manually, and is then returned to and held in operative position by a spring 317 coiled around, and connected to, the rock-shaft 310.

The stop-mechanism just described will operate not only when the material on the supply-table is exhausted, but also in case the supply-dogs fail, for any reason, to seize and advance a sheet at the proper time.

In order that the strips cut by the present machine may be conveniently and expeditiously transferred from the machine and introduced into another machine in which they are fed automatically, the present machine is provided with means for arranging and holding the cut strips in a stack, and for the support of this stack a horizontal receiving-table 318 is provided at the front of the machine, the stacked strips resting edgewise upon this table. The forward end of the stack may be supported either by a weighted follower or by a few of the strips laid upon each other, as shown in Figs. 9 and 12. The rear end of the stack is supported by retaining-fingers 320 and 322. The fingers 320 are in the form of elongated resilient strips fixed in slots at the rear edge of the receiving-table, and are provided with beveled extremities as shown in Fig. 12. The fingers 322 are mounted above the table, on pivots supported by an angle-bar 324 which is fixed on the frame of the machine and extends across the receiving-table. The fingers 322 also have beveled extremities, so that the strips may be introduced, one by one, between the fingers 320 and 322, the fingers 322 rising to permit this introduction, but being returned to operative position by gravity.

The removal of the cut strip from the cutting-bed to a position in the stack on the receiving-table involves a quarter-turn of the strip around its longitudinal axis, and for this purpose the machine is provided with rockets in the form of arms 326. These rockers are fixed on a horizontal rock-shaft 328 which is journaled on the frame of the machine. The normal position of the rockers 326 is that shown in Fig. 9, in which their upper surfaces are at the level of the cutting-bed. The rockers support the end-stops 56, and when the sheet is fed into engagement with the end-stops, and a strip is then severed by the knife, the severed strip lies upon the rockers and, by the subsequent swinging movement, upwardly and to the right, of the rockers, the strip is carried to the stack on the receiving-table.

To actuate the rockers as just described the rock-shaft 328 is provided with an arm 330 (Fig. 11) which is connected, by a rod 332, with a cam-lever 334 pivoted on the rod 88. This lever carries a roller which engages a cam 336, this cam being mounted on, and constantly rotated by, the cam-shaft 34 so as to actuate the rockers after each operation of the knife. The return-movement of the rockers is produced by a spring 338 connected with the cam-lever.

In order to insure the correct engagement of the advancing edge of the sheet of material with the end-stops 56, an edge-guide in the form of a bar 340 (Fig. 12), angular in cross-section, is arranged to rest normally upon the tops of the end-stops, the sheet being fed beneath this guide. Prior to the strip-discharging movement of the rockers, it is necessary to move the edge-guide from the path of movement of the rockers. Accordingly, the bar is supported, at its ends, on two arms 342, which are mounted on pivots 344 in brackets projecting from the frame-member 108. Each arm 342 is connected, by a link 346, with an arm 348 projecting rearwardly from the rock-shaft 328, and accordingly, when the shaft is rocked the edge-guide is swung upwardly at the same time with the rockers and into the position shown in Fig. 16.

Owing to the irregularities of the edge of the sheet-material, a trimming-cut is first taken from this edge, this cut being gaged to sever a strip of only the width necessary to insure a straight edge for the first strip. In order to gage the trimming, trimming-stops 352 are employed. These stops are in the form of blocks, adjustably mounted on arms 350, which arms project inwardly from the rockers 326 but at right-angles thereto (Figs. 12 and 16). Owing to this arrangement, the trimming-stops are in depending inoperative position, as shown in Fig. 12, during the normal strip-cutting operation of the machine, but are raised into operative position, as shown in Fig. 16, when the rockers 326 are swung upwardly to deliver a strip to the receiving-table.

In the normal operation of the machine the trimming-stops are in operative position only momentarily, and not at the time when the sheet is fed, but provision is made whereby the trimming-stops are retained in operative position during the first feed-movement of each sheet, these means acting under the control of the feelers 170. From the preceding description it will be clear that, through the operation of the cutter in connection with the different sets of stops, strips or pieces of different kinds are cut from the sheets of material presented to and operated upon by the machine.

For the foregoing purpose the rock-shaft 328 is provided with a hooked lug 354, which is adapted to cooperate with the hooked extremity of one arm 356 of a bell-crank lever, the lever being mounted on a pivot 358 on the frame of the machine. The other arm 360 of the lever is connected, by a rod 362, with a cam-lever 364 which turns on the rod 88 (Figs. 4, 16 and 18). The lever 364 carries a roller 366 which engages the periphery of the cam 140, and this cam has, as shown in Fig. 18, a single high point so located as to swing the arm 356, with the connections just described, momentarily into position above the lug 354. While the arm is in this position the actuating mechanism of the rock-shaft 328 tends to rotate it in a direction to return the rockers to normal position, but this movement, which occurs under the influence of the spring 338, is arrested, near its beginning, by engagement of the arm 356 and the lug 354, the trimming-stops being thus retained in operative position for one cycle of operations of the feed-mechanism.

Since the cam 140 is one of the group of cams mounted on the sleeve 144 and driven through the Horton clutch, it is apparent that the operation just described will occur only when the exhaustion of a sheet is indicated by the feelers 170, and when, accordingly, a fresh sheet is introduced to the feed-mechanism and between the knife and the cutting-bed.

The return of the arm 356 to the normal position, in which it does not interfere with the operation of the rock-shaft 328, is produced by a spring 368 connected to the lever 364 (Figs. 4 and 9). This spring is prevented, however, from acting at once upon the disengagement of the roller 366 from the high point on the cam 140, owing to the hooked form of the cooperating surfaces of the arm 356 and the lug 354, but upon the next succeeding cycle of operations of the cam-mechanism by which the rockers are actuated, the rock-shaft 328 is turned again to its extreme position, thereby disengaging these hooked extremities and permitting the arm 356 to swing to the right.

By the employment of a plurality of trimming-stops located on both sides of the central line of the sheet of material, together with the form of feed-mechanism hereinbefore described, economy in the utilization of sheet-material is secured, particularly in the case of material of which the edges of the sheets are irregular in form. Owing to the fact that the feed-mechanism acts upon both lateral margins of the sheet, and that it comprises two elements which are both operated simultaneously, but which have, through their yielding action, a capacity for independent operation through different distances, the sheet is, in every case, brought into engagement of its forward edge with the trimming-stops on both sides of its middle line, regardless not only of irregularities in the edge, but also of inaccuracy in the introduction of a sheet to the machine. If, from either of these causes, the edge of the sheet engages a trimming-stop at one side of its middle line, substantially in advance of the engagement with the stops on the other side of the middle line, the operation of the feed-mechanism on one edge of the sheet is arrested, but the feeding-movement of the other margin continues, owing to the yielding action of the feed-mechanism, so that the sheet is swung or turned so far as is necessary to bring its edge into full engagement with the trimming-stops. Accordingly, the waste-piece or trimming which is cut from the edges is approximately uniform across the piece, and is only of the minimum width necessary to insure the removal of irregularities from the edge.

In order to insure the proper engagement of the edge of the sheet with the trimming-stops, an inclined guide-finger 370 is associated with each stop, this finger constituting a portion of a bell-crank lever which is pivoted at the rear end of the arm 350. The guide-finger constitutes also a device to insure the clearing of the waste-piece from the feed-table, for, upon the descent of the arm 350, the guide-finger forces the waste-piece downwardly. The guide-finger is provided with a point at its extremity, to insure the downward movement of the trimming-strip; and to prevent the possibility of jamming of the material between the guide-finger and the cutting-bed, the guide-finger is retained yieldingly in operative position, on the arm 350, by means of a spring 371.

In addition to the various mechanisms which move during the automatic operation of the machine, and which have been described, the machine is provided with certain mechanisms to facilitate its adjustment for the production of strips of different widths. In producing strips for use in the manufacture of heels, it is necessary to provide for a considerable variety of widths, since strips of graded widths are used in the production of the heels or heel-blocks, in order that they may approximate the finished form of the heel and avoid unnecessary waste of material in shaping the heels.

The necessary adjustments for the purposes described involve adjustment of the position of the end-stops 56 in order to regulate the amount of material which is fed prior to each operation of the knife; adjustment of the height of the receiving-table 318, to conform to the radial distance of the end-stops from the rock-shaft 328; and adjustment of the feelers 170 toward and from the knife, in order that they may determine accurately whether the stock remaining under the control of the feed-mechanism is sufficient for the production of another strip of the particular width for which the machine is adjusted.

The receiving-table is supported by brackets 372 (Figs. 1 and 9) extending at the front of the frame of the machine. Two horizontal rock-shafts 374 and 376 are mounted transversely in bearings rising from the brackets 372, and these rock-shafts are provided, at their ends, with eccentrically arranged rollers 378, upon which the table is mounted by means of depending flanges 380 which rest upon the rollers. The lateral displacement of the table is prevented by forked members 382 which extend downwardly from the table and embrace the rock-shafts 374 and 376. The table is raised or lowered by partial rotation of the rock-shafts, and this movement is produced by worm-wheels 384 (Figs. 11 and 19) which are fixed on the rock-shafts and cooperate with worms on a horizontal worm-shaft 386, which is mounted in bearings on one of the brackets. This worm-shaft is provided, at its forward end, with a hand-crank 388 by which it may be turned to adjust the height of the table.

The adjustment of the feelers 170, to vary their distance from the knife 22, is accomplished by moving, in the required direction, the frames 174 by which the feelers are supported. Each of these frames is pivoted, at its upper end, to the depending arm of one of two bell-crank levers 390 (Fig. 9), while the lower ends of the frames are pivoted, respectively, to the depending arms of two bell-crank levers 392. The levers 390 are fixed on a rock-shaft 398, which has bearings in arms 394 projecting from the frame-member 108. The levers 392 are fixed on a rock-shaft 399 which is similarly supported from the frame-member 108. The rearwardly projecting arms of the bell-crank levers are connected by vertical links 396 (Fig. 5), so that the shafts turn and the bell-crank levers swing in unison, thus maintaining, in all adjustments, the vertical positions of the frames 174.

The rocking-movements of the parts just described may be produced in any convenient manner, but in the present machine provision is made whereby the adjustment of the feelers is performed coincidentally with, and proportionately to, the adjustment of the receiving-table 318. For this purpose the rock-shaft 398 is extended to one side of the machine, and is provided with an arm 400 which is connected, by means of a depending link 402, with a bell-crank lever 404, which is pivoted on the frame of the machine. The lever 404 is connected, by a rod 406, with a bell-crank lever 408 which is pivotally mounted on one end of the rock-shaft 376 (Fig. 9). The lever 408 is pivoted to a slide-block 410, which engages a horizontal slot in an arm 412 depending from one side of the receiving-table. Owing to this arrangement, any vertical movement of the table is transmitted to the feeler-supporting frames 174, and the parts of the connecting mechanism are so proportioned that the adjusting movements of the table and the feelers are equal in extent.

In order that the end-stops 56 may be adjusted in accordance with the width of the strips of material to be produced, these stops are in the form of studs which are movable in slots extending longitudinally in the rockers 326. The construction and arrangement of these parts is shown particularly in Figs. 19 and 20, which show the rockers respectively in their horizontal or strip-receiving position, and in their upright or strip-delivering position. By moving the stops in the slots just referred to the distance from the knife may be adjusted.

In the present machine the adjustment, just described, of the end-stops is produced coincidently with the adjustment of the receiving-table and the feelers, by mechanism connecting the end-stops with the table. For this purpose the stops are fixed to a bar 414 which extends transversely beneath the rockers 326. At its ends this bar is provided with pairs of flanges 424, which embrace slide-blocks pivoted to arms of two bell-crank levers 420 and 422. These levers are pivoted on yoke-shaped members 416 and 418 which are fixed on the rock-shaft 328. In order that the movements of the bell-crank levers may be equal, they are connected by a link 426. The lever 422 has a third arm 428 provided with a stud which engages a slotted sleeve 430 arranged to slide on the rock-shaft 328. This sleeve has a threaded projection which screws into a socket in a second sleeve 432. This second sleeve is also slotted, and engages a stud on one arm of a bell-crank lever 434, which is pivotally mounted on the frame of the machine. The arrangement just described is such that movements of the lever 434 may be transmitted, through the slotted sleeves 430 and 432, to the lever 422, regardless of the rocking movements of the parts about the axis of the rock-shaft 328.

The bell-crank lever 434 is pivoted to a slide-block movable in a horizontal slot which is formed in the end of an arm 436 depending from the receiving-table. The arrangement just described is such that vertical movement of the table produces corresponding equal movement of the end-stops along the rockers 326, that is, radially with respect to the rock-shaft 328. The threaded connection between the sleeves 430 and 432 permits an exact preliminary adjustment of the relative position of the end-stops and the other adjustable instrumentalities.

To assist the operator of the machine in making the adjustments hereinbefore described, the machine is provided with means for gaging and indicating the position of the receiving table to permit it to be quickly and conveniently set in accordance with the width of the strips which it is desired to produce. The angle-bar 324 supports a setting-gage which is shown particularly in Figs. 4, 11 and 19. This gage comprises a series of square rods 438, which rest in a recess at the front of a block 440, being clamped against the block by a clamp-plate 442 which extends across the upper ends of the rods and is fastened to the block by binding-screws. The block is provided, at the rear, with a flange 444 which overhangs the upper edge and the rear surface of the angle-bar 324, and fits loosely against the latter, so that the gage is supported by the bar but may be readily slid along the bar into or out of operative position.

The rods 438 constitute gage-members by which the machine may be set to produce strips of a graded series of widths. These widths are respectively determined by the height of the several rods in the position in which they are clamped on the block 440. Since the graduations in the widths of the strips are usually required to be uniform, the preliminary adjustment of the gage-rods is facilitated by means of a setting-bar 446 which extends along the backs of the gage-rods and is mounted upon studs 448 projecting from the endmost rods, these studs passing through a longitudinal slot in the setting-bar. Each intermediate gage-rod is provided with a pin 450 projecting into the slot in the setting-bar. When the setting-bar is at right-angles to the gage-rods the lower ends of the gage-rods are all in horizontal alignment, but by swinging the setting-bar to any other angular relation with regard to the gage-rods, the latter may be brought to a stepped relation, with their lower ends in a uniform graduation of height as shown in Fig. 19, and the gage-rods may then be clamped in position by means of the clamp-plate 442.

The setting-gage just described may be arranged to cooperate directly with the upper surface of any projection from the receiving-table, but since it is difficult to observe, with the desirable accuracy, the moment of engagement of the table with the setting-gage, the table of the illustrated machine is provided with a gaging-abutment which is connected with the table through a sensitive indicator. This abutment is in the form of an arm 452 which is pivoted, at one end, to the shorter arm of a lever 454. The lever is pivoted, at 456 (Fig. 1), on the side of the table, and its comparatively heavy longer arm tends to swing downwardly and raise the abutment 452, this movement being limited by a stop-pin 462 which projects from the table through a slot in the lever. The forward extremity of the lever is connected, by a link 458, with a rocking-member 460 which also is pivoted on the table. The rocking-member and the table may have cooperating marks A and B (Fig. 3) to indicate when the rocking-member is in a definite angular position on its pivot.

When the setting-gage is to be used, it is slid along the angle-bar 324 until one or another of its gage-rods 438 is in position above the abutment 452. The crank 388 is then turned to raise the receiving-table and bring the abutment into contact with the gage-rod. Upon continued upward movement of the table, the lever 454 is moved, thus turning the rocking-member 460 upon its pivot, and as soon as this movement has brought the two marks A and B, above described, into registry, the adjusting movement is understood to have been completed. The setting-gage may then be slid to the end of the bar 324, out of the way of the strips which are subsequently discharged on the receiving table.

In order that the abutment 452 may also be moved out of the paths of the strips, it is swung forwardly about its pivotal connection with the lever 454. When it is in upright operative position, as shown, it rests against a stop-pin 463 (Fig. 1) projecting from the table.

The operation of the machine as a whole is as follows: The operator manipulates the handle 288 to release the supply-table and permit it to fall, and then places a stack of sheets of material upon the table. By means of a crank applied to the shaft 218, he then raises the supply-table until the uppermost sheet engages the foot 272. The operator then swings the clutch-lever 44 to the position shown in the drawings, in which position it is retained by the latch 314, and power is thus communicated to the power-shaft 40, and thence to the machine as a whole. The cutter-beam and the knife then reciprocate, and since the absence of a sheet beneath the feelers 170 permits them to fall to the position of Fig. 9, the Horton clutch is thrown into operation in the manner hereinbefore described, so as to cause the supply-dogs to transfer a sheet from the stack to the feed-table and into the path of operation of the feed-dogs. The feed-dogs then commence to feed the sheet intermittently, while the feelers are held from further operation, for the time being, by engagement with the sheet of material, so that the operation of the Horton clutch is not repeated. The first feed-movement of the sheet brings it into engagement with the trimming-stops, which at this time are in operative position, and a narrow trimming is cut from the forward end of the sheet. Upon the next rotation of the cam-shaft, the rockers are brought to their strip-receiving position, while the trimmed piece is ejected downwardly. At the next feed-movement of the sheet, it engages the end-stops 56, whereby a strip of full width is gaged and is then cut by the knife. As the knife rises again, the rock-shaft 328 is turned so that the edge-guide 340 rises and the rockers raise the strip and press it forwardly between the retaining-fingers 320 and 322. Upon the return-movement of the rockers, the strip is thus left standing on edge on the receiving-table, where it is supported either by a follower or by a pile of previously cut strips, as shown in Fig. 9. The feeding and cutting operations are continued until the sheet has become so far exhausted that its rear edge moves beyond the retaining-pawls 104, whereupon the end-pushers 112 are thrown automatically into operation to feed the extremity of the sheet. Upon the next succeeding operation of the feelers they fail to encounter any material, and accordingly the Horton clutch is again thrown into operation, so as to cause the supply-dogs to supply a fresh sheet of material, while, at the same time, the pivoted table 60 is swung downwardly to discharge the waste-piece at the rear end of the sheet. The operation as above described is then repeated indefinitely, as long as any sheets of material remain upon the supply-table, but when the material is exhausted the machine is automatically stopped in the manner hereinbefore described.

While the present invention has been described particularly as embodied in a machine for cutting strips with parallel edges from a sheet of material, it will be apparent that various features of the invention are applicable to machines for cutting pieces of various characters from a sheet or continuous length of material, and that the invention is not, in general, limited to the embodiment thereof hereinbefore described and illustrated in the accompanying drawings, but may be embodied in various other forms within the scope of the following claims.

What is claimed as new, is:

1. A stock-cutting machine having, in combination, means for supporting a sheet of material, and for successively cutting pieces therefrom, in a substantially horizontal position; single means for supporting the successive pieces, as cut, and moving them into substantially vertical position: and means for supporting them in a horizontally-extended stack.

2. A stock-cutting machine having, in combination, a substantially horizontal feed-table; means for successively cutting pieces from a sheet of material thereon; a substantially horizontal delivery-table disposed beyond and above said feed-table; and means disposed beneath the end of the sheet for successively conveying the pieces, as cut, to the delivery-table and delivering them thereon in substantially vertical position.

3. A stock-cutting machine having, in combination, a feed-table; a knife for cutting a piece from the end of a sheet of material thereon; a delivery-table beyond the feed-table; a rocking-member disposed beneath the end of the sheet for receiving the cut piece; and means for swinging the rocking-member towards the delivery-table to cause it to deliver the piece thereon in stacked relation to the pieces previously delivered.

4. A stock-cutting machine having, in combination, cutting-means for cutting a piece from the end of a sheet of material; a delivery-table located beyond the cutting-means; a rocking-member which supports the cut piece and transfers it to the delivery-table; and an end-stop, carried by the rocking-member, against which the sheet is fed prior to the cutting-operation.

5. A stock-cutting machine having, in combination, cutting-means for cutting a piece from the end of a sheet of material; a delivery-table located beyond the cutting-means; a rocking-member which supports the cut piece and transfers it to the delivery-table; an end-stop carried by the rocking-member in position to cooperate with the sheet-material when the rocking-member is in position to receive the cut piece; and a trimming-stop carried by the rocking-member in position to cooperate with the sheet-material when the rocking-member is rocked into delivering position.

6. A stock-cutting machine having, in combination, means for cutting pieces from the end of a sheet of material; a trimming-stop movable into position to engage the advance-end of the sheet to gage a trimming from the end of the sheet during the cutting operation; and means for moving the trimming-stop out of operative position before the succeeding operation of the cutting-means.

7. A stock-cutting machine having, in combination, means for cutting pieces from the end of a sheet of material; a trimming-stop movable into position to engage the advance-end of the sheet to gage a trimming from the end of the sheet during the cutting operation; and means for moving the trimming-stop out of operative position, and for ejecting the trimming from the cutting-means before the succeeding operation of the cutting-means.

8. A stock-cutting machine having, in combination, means for cutting pieces from the end of a sheet of material; and end-stop to determine the size of the pieces normally cut; a trimming-stop to gage a trimming narrower than the pieces normally cut; and automatic means for moving the trimming-stop into operative position and for holding it in such position during only a single operation of the cutting-means.

9. A stock-cutting machine having, in combination, means for cutting pieces from the end of a sheet of material; a trimming-stop for gaging a trimming from the end of the sheet; a guide for engaging the margin of the sheet to guide its edge into engagement with the trimming-stop; and means for moving the trimming-stop out of operative position and for simultaneously moving the guide in a direction to eject the trimming.

10. A stock-cutting machine having, in combination, cutting-means for cutting pieces from the end of a sheet of material; and gaging-means acting upon the advanced end of the sheet constructed and arranged to automatically gage, first, a comparatively narrow trimming, and thereafter a succession of wider normal pieces.

11. A stock-cutting machine having, in combination, means for feeding a sheet of material intermittently, means for cutting pieces from the end of the sheet between the successive feed-movements; and gaging means acting upon the advanced end of the sheet to automatically gage, first, a comparatively narrow trimming, and thereafter a comparatively wide piece.

12. A stock-cutting machine having, in combination, means for producing a series of straight cuts across the end of a sheet of material; and means acting upon the advanced end of the sheet for gaging said cuts automatically to produce, first, a narrow trimming to remove irregularities in the edge of the sheet, and thereafter one or more strips with parallel straight edges.

13. A stock-cutting machine having, in combination, means for cutting a series of pieces from the end of a sheet of material; and positive means for automatically separating the first piece from the succeeding pieces.

14. A stock-cutting machine having, in combination, means for cutting a series of pieces from the end of a sheet of material; means for positively ejecting the first piece; and automatic means for stacking the succeeding pieces.

15. A stock-cutting machine having, in combination, means for cutting a series of pieces from the end of a sheet of material; a receiver for the cut pieces; means for positively transferring the cut pieces from the cutting-means to the receiver; and automatic means for discharging the waste-piece at the rear end of the sheet separately from the cut pieces.

16. A stock-cutting machine having, in combination, means for cutting a series of pieces from the end of a sheet of material; a table to support the material during the cutting operation; means for advancing the material upon the table to feed it to the cutting-means; and means controlled by the sheet for swinging the table downwardly to discharge the waste-piece at the rear end of the sheet.

17. A stock-cutting machine having, in combination, a horizontal table for supporting a sheet of material to be cut and having an opening therein the width of the sheet; a vertically movable cutting knife disposed above said opening; a narrow cutting bed for cooperative action with the knife disposed within said opening and in the plane of the supporting table, and also spaced from both adjacent edges of the table to permit cut pieces to fall by gravity on both sides of the narrow bed; movable supporting means normally occupying horizontal positions in the spaces on both sides of the bed; and means for withdrawing said movable supporting means under predetermined conditions to permit the discharge of pieces supported thereby.

18. A stock-cutting machine having, in combination, a downwardly directed cutting-knife; a cutting-bed which cooperates with the knife; means for producing a relative reciprocation of the knife and the bed; and means for feeding a sheet of material intermittently between and past the knife and the bed; the bed having a width which is small in proportion to the width of the pieces severed by the knife so that pieces may be discharged by gravity on both sides of the bed.

19. In a stock-cutting machine having a downwardly-directed cutting-knife, a cutting-bed comprising a comparatively wide and thin strip of yielding material supported beneath the knife with its width upright so as to present one edge of the strip to the edge of the knife; and comparatively thin clamp-jaws between which said strip is embraced and supported, so as to permit the free discharge by gravity of the cut pieces on both sides of the cutting-bed.

20. In a stock-cutting machine having a downwardly-directed cutting-knife, and means for feeding a sheet of material intermittently past the knife, a cutting-bed cooperating with the knife and projecting to the side thereof from which the material is fed, only a distance small in comparison with the amplitude of each feed-movement, to permit the rear end of the sheet to fall clear of the cutting-bed when severed.

21. A stock-cutting machine having, in combination, a cutting-bed; an elongated cutting-knife cooperating with the bed and having an acute edge defined by two planes of which one is at a more acute angle than the other to the plane of the cutting-bed; means for relatively reciprocating the bed and the knife; and means for feeding a single thickness of sheet-material between the knife and the bed, whereby at each operation of the knife a strip is cut having one square edge and one beveled edge, a square edge being produced on the material at one side of the knife and a beveled edge on the material at the other side thereof.

22. A stock-cutting machine having, in combination, a cutting-bed; an elongated cutting-knife cooperating with the bed and having an acute edge defined by two planes of which one is at a more acute angle than the other to the plane of the cutting bed; means for relatively reciprocating the bed and the knife; means for feeding a single thickness of sheet-material between the knife and the bed, whereby at each operation of the knife a strip is cut having one square edge and one beveled edge, a square edge being produced on the material at one side of the knife and a beveled edge on the material at the other side thereof; and means for stacking the strips with their similar edges adjacent.

23. A stock-cutting machine having, in combination, means comprising a straight edged rigid knife for cutting, from a sheet of material, a series of strips each having a square edge and a beveled edge; and means for removing the cut strips from the knife and delivering them in stacked relation with their similar edges adjacent.

24. A stock-cutting machine having, in combination, means for cutting pieces from the end of a sheet of material; a support, for the cut pieces, located beyond the cutting-means; means for moving the support from its receiving position to a discharging position; a guide normally located adjacent the path of movement of the material beyond the cutting-means and adapted to guide the material to the proper position on the support; and means for moving the guide out of the path of movement followed by the support when moving from receiving position to discharging position.

25. A stock-cutting machine having, in combination, means for cutting pieces from the end of a sheet of material; a support, for the cut pieces, located beyond the cutting-means; a stop, mounted on the support, for limiting the feeding movement of the sheet beyond the cutting-means; a guide co-operating with the stop to direct the end of the sheet into engagement with the stop; and means for moving the guide out of operative relation to the cut piece prior to the discharge thereof by the support.

26. A stock-cutting machine having, in combination, cutting-means; primary feed-mechanism for advancing a piece of stock to the cutting means; and supplementary spring-actuated feed-mechanism for automatically engaging the rear end of the stock and feeding it to the cutting-means when the stock becomes reduced in width to a predetermined amount.

27. A stock-cutting machine having, in combination, cutting-means; primary feed-mechanism for advancing a sheet of stock intermittently to the cutting means by engagement with its face; normally stationary supplementary feed-mechanism for engaging the rear end of the stock and feeding it thereto, and means for automatically throwing said supplementary feed-mechanism into operation.

28. A stock-cutting machine having, in combination, cutting-means; primary feed-mechanism for advancing a piece of stock intermittently to the cutting-means; supplementary feed-mechanism for feeding the rear extremity of the sheet; and stock-supplying mechanism operating automatically to supply a fresh piece of stock to the primary feed-mechanism at each operation of the supplementary feed-mechanism.

29. A stock-cutting machine having, in combination, cutting-means; primary feed-mechanism for advancing a sheet of material to the cutting-means; and supplementary feed-mechanism comprising pushers operative on the rear edge of the sheet; and means for actuating the pushers; and means for holding them normally out of the path of the sheet.

30. A stock-cutting machine having, in combination, cutting-means; primary feed-mechanism for advancing a piece of material to the cutting-means; supplementary feed-mechanism for advancing the rear end of the piece; and means, controlled by engagement with the piece of material, for throwing the supplementary feed-mechanism automatically into operation.

31. A stock-cutting machine having, in combination, cutting-means; a support on which a piece of material may be fed to the cutting-means; feed-mechanism cooperable with the rear extremity of the piece of material; and means, controlled by engagement with the piece of material, for throwing the feed-mechanism automatically into operation when the rear extremity of the material has reached its path of movement.

32. A stock-cutting machine having, in combination, cutting-means; a support on which a piece of material may be fed to the cutting-means; a retaining-device for engaging the material to prevent retrograde movement thereof; and feed-mechanism operable upon the material, said mechanism being normally inoperative but being connected with and controlled by the retaining-device so as to be thrown automatically into operation when the piece of material moves out of engagement with the retaining-device.

33. A stock-cutting machine having, in combination, cutting-means; primary feed-mechanism for advancing a piece of material intermittently to the cutting-means; a retaining device engageable with the material to prevent retrograde movement thereof; and supplementary feed-mechanism for feeding the rear end of the piece of material, said means being connected with and controlled by the retaining-device so as to be thrown automatically into operation when the rear end of the piece moves beyond the retaining-device.

34. A stock-cutting machine having, in combination, cutting-means; a support for a sheet of material; and yielding means for feeding the sheet over the support to the cutting-means, comprising clamping-devices operating concurrently upon the lateral margins of opposite edges of the sheet and having a reciprocatory movement so as to feed the sheet intermittently.

35. A stock-cutting machine having, in combination, cutting-means; and yielding means, for feeding a sheet of material intermittently to the cutting-means, comprising two clamping-devices engaging the opposite lateral margins of the sheet and operable frictionally to clamp or release the sheet according to their direction of relative movement, and means for reciprocating the clamping-devices in the direction of feed.

36. The combination, in an organized machine, of means for operating on a piece of stock; means for holding a supply of pieces of stock; movable means for transferring pieces automatically from the supply to the operating means as required, said transferring means traversing different paths of movement dependent upon the presence or absence of a piece of stock to be transferred; power-mechanism for actuating the machine; and means disposed in the path of movement of the transferring means when an absence of stock to be transferred obtains, and adapted to be engaged and actuated thereby to automatically throw the power-mechanism out of operation.

37. The combination, in an organized machine, of means for operating on a piece of stock; means for holding a supply of pieces of stock; means for transferring pieces automatically from the supply to the operating-means as required; power-mechanism for actuating the machine; and means, actuated by the transferring-means, for throwing the power-mechanism out of operation upon the failure of the transferring-means to engage a piece of stock at the time when the transferring operation should occur.

38. A machine having, in combination, means for operating on a sheet of material; means for controlling the operation of the machine on the sheet, comprising a plurality of feelers arranged to engage the sheet at separate points aligned in accordance with the normal form of an edge of the sheet and adapted to become operative when disengaged by said edge in the progress of the sheet through the machine; and connections, between the feelers and the other parts of the controlling-means, adapted to function upon the disengagement of any one or more of the feelers due to an irregularity in the shape of its edge.

39. A stock-cutting machine having, in combination, means for cutting pieces from the end of a sheet of material; means for advancing the sheet to the cutting-means; means for discharging the waste-piece at the rear end of the sheet; a plurality of feelers arranged to engage the sheet but to be disengaged thereby in consequence of the feeding of the sheet; and connections, between the feelers and waste-piece discharging-means, for throwing said means automatically into operation, the feelers being aligned in accordance with the normal shape of the edge of the sheet but being operative upon the said discharging-means, through said connections, whenever any one of the feelers is disengaged by the material.

40. A stock-cutting machine having, in combination, means for cutting pieces from the end of a sheet of material; two end-stops arranged to be engaged by the advanced end of the sheet, on opposite sides of the middle thereof, to limit the feed-movements of the sheet; and means for advancing the sheet intermittently into full engagement with both stops.

41. A stock-cutting machine having, in combination, means for cutting pieces from the end of a sheet of material; two end-stops arranged to be engaged by the advanced end of the sheet, on opposite sides of the middle thereof, to limit the feed-movements of the sheet; and independently operable feeding-means engaging the lateral margins of the sheet and adapted to feed them simultaneously through relatively variable distances, so as to bring the advanced end of the sheet into full engagement with both of said stops regardless of irregularities in the outline of said end.

42. A stock cutting machine having, in combination, means for cutting pieces from the end of a sheet of material; stopping-means located beyond the point of operation of the cutting-means for abutting against the advanced end of the sheet, at widely separated points, to limit the feed-movement of the sheet and determine the position of its forward edge; and feeding-means for advancing the sheet into engagement with the stopping-means, said feeding-means being yieldable to permit the sheet to be arrested and also to permit it to turn in its own plane in settling into full engagement with the stopping-means.

43. A stock-cutting machine having, in combination, means for cutting strips from the edge of a sheet of material; sheet-feeding means comprising a plurality of members which engage the rear edge of the sheet and push it forward, said members being independently and yieldingly actuated, and being arranged to engage the sheet at intervals along said edge; and means for engaging the forward edge of the sheet to arrest the feed-movement produced by said feeding-means.

44. A machine having, in combination, means for operating on a sheet of material; means for feeding the sheet to the operating-means; means, for automatically controlling the operation of the machine on the sheet, comprising a plurality of feelers arranged to engage the sheet at different points; and means for adjusting all of the feelers simultaneously in the direction of feed.

45. A stock-cutting machine having, in combination, means for cutting pieces from the end of a sheet of material; means for supporting the sheet in horizontal position during the operation of the cutting-means thereon; a horizontal receiving-table; means for transferring the cut pieces from the cutting-means to said table and for stacking them on edge thereon; and means for adjusting the height of the table to adapt it to receive pieces of different widths.

46. A stock-cutting machine having, in combination, means for cutting pieces from the end of a sheet of material; means for gaging the size of the pieces so cut; means for stacking the cut pieces; receiving-means for the stack of pieces; and means for adjusting simultaneously said gaging-means and said receiving-means to adapt the machine for the production of pieces of different sizes.

47. A stock-cutting machine having, in combination, means for cutting pieces from the end of a sheet of material; a support on which the sheet may be fed intermittently past the cutting-means; a table, located beyond the cutting-means, to receive the cut pieces; a rocking-member for transferring the cut pieces to the table and stacking them on edge thereon; an end-stop, mounted on the rocking-member, for arresting the feed-movements of the sheet to gage the cut pieces; and means for adjusting, simultaneously, the height of the table and the position of the end-stop on the rocking-member, in accordance with the size of the pieces to be cut.

48. A stock-cutting machine having, in combination, cutting-means; means for feeding a piece of stock intermittently to the cutting-means; a feeler, for controlling the operation of the machine, arranged to engage the piece of stock; and means for adjusting, simultaneously, the feeding-means, to vary the length of feed, and the feeler, to vary its point of operation in accordance with the length of feed.

49. A stock-cutting machine having, in combination, cutting-means; means for advancing a piece of material intermittently past the cutting-means; an end-stop, located beyond the cutting-means in the direction of feed, to determine the length of the feed; a feeler, for controlling the operation of the machine, arranged to engage the stock in the rear of the cutting-means; and means for adjusting, simultaneously, the end-stop and the feeler towards and from the cutting-means to adjust the machine for the production of pieces of different sizes.

50. A stock-cutting machine having, in combination, means for cutting pieces from the end of a sheet of material; a receiver for the cut pieces; a rocking-member for transferring the pieces to the receiver; an end-stop, carried by the rocking-member, for gaging the width of the cut pieces; and means, operable regardless of the rocking-movement of the rocking-member, to adjust the end-stop radially thereon.

51. A machine having, in combination, an operative instrumentality, means for adjusting said instrumentality, and a gage, for determining said adjustment, comprising a series of gage-members located side-by-side and adjustable, in the same general direction, to various relative positions.

52. A stock-cutting machine having, in combination, a feed-table; means for cutting pieces from a sheet of material thereon; a delivery-table beyond the cutting means; a pivoted member forming a continuation of said feed-table, upon which the pieces rest as they are cut from the sheet; means for rotating upwardly said pivoted member to deliver the piece thereon to said delivery-table in horizontally stacked relation to the pieces previously delivered; and means for retaining the pieces upon the delivery-table.

53. A stock-cutting machine having, in combination, a feed-table; means for cutting pieces from a sheet of material thereon; a delivery-table beyond the cutting means; a pivoted member forming a continuation of said feed-table, upon which the pieces rest as they are cut from the sheet; and means for rotating said pivoted member subsequent to each operation of the cutting means to cause it to successively deliver the pieces cut from the sheet to said delivery-table.

54. A stock-cutting machine having, in combination, cutting means; a table for supporting a supply of sheets of material; means for periodically raising said table to bring the uppermost sheet to a predetermined height; means for periodically advancing the uppermost sheet upon said supply-table, and means operating between successive advancing movements for intermittently feeding each sheet so advanced to said cutting means.

55. A stock-cutting machine having, in combination, a feed-table; cutting means at one end of the table for cutting pieces from a sheet of material; means disposed at the other end of said table for supporting a supply of said sheets; automatic means dependent upon the height of the supply of sheets for maintaining the uppermost sheet of the supply at substantially the height of the feed-table; means for successively advancing the uppermost sheet in its own plane upon said feed-table; and means for intermittently feeding each sheet so advanced to said cutting means.

56. A stock-cutting machine having, in combination, a feed-table; cutting means at one end of the table for cutting pieces from a sheet of material; means disposed at the other end of said table for supporting a supply of said sheets; automatic means for maintaining the uppermost sheet of the supply at substantially the height of the feed-table; means for advancing the uppermost sheet of the supply upon said feed-table; means for intermittently feeding the sheets so advanced to said cutting means; and automatic means dependent upon the width of the sheet being fed for initiating the operation of said advancing means.

57. A stock-cutting machine having, in combination, a table for supporting sheets to be cut and having an opening therein; a vertically reciprocating acute cutting knife disposed above said opening; and a narrow cutting bed for cooperating with said knife disposed within said opening and in the plane of the supporting table, said cutting-bed being spaced from both adjacent edges of the table to permit cut pieces to fall by gravity on both sides of the narrow bed.

58. A stock-cutting machine having, in combination, means for cutting a series of pieces from a sheet of material; a normally raised table for supporting the material during the cutting operation; means for advancing the material upon the table to said cutting means; a feeler for engaging the material as it is advanced; and means responsive to the action of said feeler for actuating said table to discharge the narrow waste-piece at the rear end of the sheet.

59. A stock-cutting machine having, in combination, cutting means; reciprocating means for normally feeding a piece of stock step-by-step to the cutting means by engagement with the surface thereof; and separate means rendered operable when the stock becomes too short to be fed by the reciprocating feed means for engaging the rear edge of the relatively narrow end of the stock and feeding it to the cutting means.

60. A stock-cutting machine having, in combination, reciprocating cutting means; feeding means for advancing a sheet of stock to the cutting means; a plurality of normally restrained spring-actuated pushers independently operative on the rear edge of the sheet for advancing it to the cutting means; means upon said reciprocating cutting means for setting said pushers in their restrained positions; and means normally engaging the sheet for releasing said pushers under predetermined conditions.

61. A stock-cutting machine having, in combination, means for cutting a series of pieces from the end of a sheet of material; means for ejecting the first piece cut therefrom; and means for discharging the waste-piece at the rear end of the sheet.

62. A stock-cutting machine having, in combination, means for cutting a series of pieces from the end of a sheet of material; means for ejecting the first piece cut therefrom; means for stacking the succeeding pieces; and means for discharging the waste-piece at the rear end of the sheet.

63. A stock-cutting machine having, in combination, means for cutting a series of pieces from the end of a sheet of material; means for ejecting the first piece; and means acting upon the succeeding pieces for positively assembling them in stacked relation.

64. A stock-cutting machine having, in combination, means for cutting a series of pieces from the end of a sheet of material; means for ejecting the first piece; and means operative only after the ejection of the first piece for stacking the succeeding pieces.

65. A stock-cutting machine having, in combination, means for supporting a sheet of material; means for cutting pieces therefrom; and means acting upon the respective lateral marginal edges of the sheet for intermittently advancing the sheet to the cutting means.

66. A stock-cutting machine having, in combination, means for supporting a sheet of material; means for cutting pieces therefrom; stops for positioning the sheet under said cutting means; and independent yielding means acting upon the respective lateral marginal edges of the sheet for advancing the sheet into engagement with said stops.

67. A stock-cutting machine having, in combination, means for cutting pieces from a sheet of material; means for feeding the sheet to said cutting means; auxiliary mechanism; a plurality of feelers for detecting the presence of a sheet as it is fed; and equalized transmitting means connecting the respective feelers for controlling the operation of said auxiliary mechanism when any one of the feelers fails to engage the sheet.

68. A stock-cutting machine having, in combination, a feed-table; cutting means at one end of the table for cutting pieces from a sheet of material; means disposed at the other end of said table for supporting a supply of said sheets; means for successively advancing the uppermost sheets upon said feed-table; means for intermittently feeding the sheets so advanced to said cutting means; means for supplying power to operate the machine; and means for cutting off the supply of power when said advancing means fails to advance a sheet from said supply.

69. A stock-cutting machine having, in combination, means for cutting pieces from a sheet of material; a stop for fixing the position of the sheet beneath the cutting means; feeding means for advancing the sheet against said stop; a feeler for engaging the sheet as it is fed to determine the width thereof; and means for proportionately adjusting the positions of said stop and feeler.

70. A stock-cutting machine having, in combination, means for cutting pieces from a sheet of material; a stop beyond the cutting means for fixing the width of the piece to be cut; feeding means for advancing the sheet against said stop; a feeler located ahead of the cutting means a distance equal to that of the stop beyond it, said feeler being adapted to engage the sheet as it is fed to determine the width thereof; and means for concurrently and proportionately adjusting the positions of said stop and said feeler.

71. A stock-cutting machine having, in combination, means for cutting pieces from a sheet of material; a stop for fixing the width of the piece to be cut; feeding means for advancing the sheet against the stop; a feeler for operating upon the sheet as it is fed to determine the width thereof; and means for adjusting the position of said feeler.

72. A machine having, in combination, means for operating upon a sheet of material; means for feeding the sheet to the operating means; an intermittently operable feeler for automatically controlling the operation of the machine upon the sheet and adapted to periodically engage said sheet as it is fed; and means for adjusting the position of said feeler with respect to said operating means.

73. A stock-cutting machine having, in combination, cutting means; means reciprocating towards and from a point spaced from said cutting means for intermittently feeding the stock thereto; auxiliary feed means adapted to engage the narrow end of the stock at said point and feed it to the cutting means; and means dependent upon the width of the stock for throwing said auxiliary feed means into operation.

74. A stock-cutting machine having, in combination, cutting means; primary feed-mechanism including reciprocating means spaced from said cutting means for normally feeding the stock thereto in a series of steps; and supplementary feed means operating upon the stock after it leaves the primary feed mechanism for yieldingly feeding the remainder of the stock to said cutting means.

75. A stock-cutting machine having, in combination, cutting means; and means for yieldingly feeding a piece of stock to the cutting means by engagement with the surface thereof, and for yieldingly feeding the relatively narrow end of the stock by engagement with the rear edge thereof.

76. A stock-cutting machine having, in combination, cutting means; means for normally feeding the stock to the cutting means; a normally restrained spring-actuated pusher independently operative on the rear edge of the stock for advancing it to the cutting means; and means dependent upon the width of the stock being fed for releasing said pusher.

77. A stock-cutting machine having, in combination, cutting means; means for feeding a piece of stock in a series of steps in the direction of and to the cutting means; means for holding a supply of stock; and means operating in the direction of feed for advancing a piece of stock from the supply into the region of operation of said feeding means when the strip being fed becomes exhausted.

78. A stock-cutting machine having, in combination, means for cutting a narrow first trimming from the end of a sheet of material; and automatic means operable only after the trimming is cut to engage and actuate the trimming from the line of feed of the material for effecting its discharge.

79. A stock-cutting machine having, in combination, means for cutting a series of pieces from the end of a sheet of material; and automatic means adapted to engage and actuate the first trimming and succeeding cut-pieces for discharging the trimming separately from the cut pieces.

80. A stock-cutting machine having, in combination, means for cutting a series of pieces from the end of a sheet of material; and automatic means for discharging the first trimming and subsequently engaging and actuating the succeeding cut-pieces and delivering them in stacked relation.

81. A stock-cutting machine having, in combination, means for cutting a series of pieces from the end of a sheet of material; and automatic means for engaging and actuating the pieces as cut and discharging the waste-piece at the rear end of the sheet separately from the cut pieces.

82. A stock-cutting machine having, in combination, means for cutting a series of pieces from the end of a sheet of material; and automatic means for discharging the first trimming and the waste-piece at the rear end of the sheet.

83. A stock-cutting machine having, in combination, means for cutting a series of pieces from the end of a sheet of material; and automatic means for discharging the first trimming and the waste-piece at the rear end of the sheet and for delivering the intermediate pieces of the series in stacked relation.

84. A stock-cutting machine having, in combination, means for cutting pieces from the end of a sheet of material; two separated end-stops positioned to be engaged by the advanced end of the sheet on opposite sides of the middle thereof to determine both the width of the piece to be cut and the angular position of the sheet relative to the cutting means; and means constructed and arranged to feed the sheet and, as an incident of the feeding, to permit the sheet to be angularly turned in its own plane to ensure the advanced end of the sheet being brought into full engagement with both of said end-stops.

85. A stock-cutting machine having, in combination, means for cutting pieces from the end of a sheet of material; gaging-means located beyond the cutting means for determining the position of the advanced end of the sheet and against which said end of the sheet is engaged at widely separated points on opposite sides of the middle of the sheet; and means constructed and arranged to permit the sheet to be arrested and also to turn angularly in its own plane for feeding the sheet into full engagement with said gaging-means.

86. A stock-cutting machine having, in combination, means for cutting pieces from the end of a sheet of material; a plurality of sets of stops for gaging the widths of the cut-pieces; means for feeding the material into position against the stops; and means for actuating the one or the other set of stops into operative position to gage pieces of different widths.

87. A stock-cutting machine having, in combination, means for cutting pieces from the end of a sheet of material; separate gaging-means adapted to act upon the advanced end of the sheet to respectively gage pieces of different widths; and means for moving one gaging-means into operative position while the other gaging-means is moved into inoperative position.

88. A stock-cutting machine having, in combination, means for cutting pieces from the end of a sheet of material; and gaging-means against which the material is fed for gaging a piece of a predetermined width and during the continued operation of the cutting means to gage a piece of a predetermined different width.

89. A stock-cutting machine having, in combination, means for cutting pieces from the end of a sheet of material; a plurality of gaging-means against which the material is fed for gaging pieces of different widths respectively, and means operable between continued successive cutting operations for rendering the one or the other gaging-means operative.

90. A stock-cutting machine, having in combination, cutting means for severing pieces from sheets of material, a plurality of sets of stops, means for feeding material into position against the stops, and means for operating the sets of stops in timed relation to each other to effect in conjunction with the cutting means the cutting of different kinds of pieces from sheets of material.

91. A stock-cutting machine, having in combination, cutting means for severing pieces from the ends of sheets of material, separate gaging means to position sheets of material for cutting different kinds of pieces therefrom, and means for moving one gaging means into operative position while the other gaging means is moved into inoperative position.

ERASTUS E. WINKLEY.